United States Patent [19]

Yoshida et al.

[11] Patent Number: 5,717,744
[45] Date of Patent: Feb. 10, 1998

[54] DATA COMMUNICATING APPARATUS HAVING USER NOTIFICATION CAPABILITY AND METHOD

[75] Inventors: Takehiro Yoshida, Tokyo; Koji Okabe, Yokohama, both of Japan

[73] Assignee: Canon Kabushiki Kaisha, Tokyo, Japan

[21] Appl. No.: 404,282

[22] Filed: Mar. 14, 1995

[30] Foreign Application Priority Data

Mar. 16, 1994 [JP] Japan .................. 6-071611
Feb. 13, 1995 [JP] Japan .................. 7-023829

[51] Int. Cl.⁶ .................................................. H04M 11/00
[52] U.S. Cl. .................. 379/100; 358/438; 358/434
[58] Field of Search .................. 379/100, 93, 96–98, 379/142, 67, 88, 89; 358/400, 434–436, 442, 468, 440

[56] References Cited

U.S. PATENT DOCUMENTS

| | | | |
|---|---|---|---|
| 4,654,718 | 3/1987 | Sueyoshi | 379/100 |
| 4,922,524 | 5/1990 | Baba et al. | 379/100 |
| 4,996,707 | 2/1991 | O'Malley et al. | 379/100 |
| 5,008,926 | 4/1991 | Misholi | 379/100 |
| 5,091,931 | 2/1992 | Milewski | 379/100 |
| 5,093,857 | 3/1992 | Yoshida et al. | 379/100 |
| 5,127,047 | 6/1992 | Bell et al. | 379/100 |
| 5,138,654 | 8/1992 | Yuki | 379/100 |
| 5,189,696 | 2/1993 | Yoshida | 379/355 |
| 5,282,242 | 1/1994 | Hachinoda | 379/100 |
| 5,314,643 | 5/1994 | Yoshida et al. | 379/100 |
| 5,384,830 | 1/1995 | Ide | 379/100 |

*Primary Examiner*—Wing F. Chan
*Attorney, Agent, or Firm*—Fitzpatrick, Cella, Harper & Scinto

[57] ABSTRACT

A data communicating apparatus such as a facsimile is constructed by a receiver to receive data from a transmission side, a notifying unit to notify by a voice a fact that the data is being received by the receiver, and an identifying unit to identify a name of the transmission side. The notifying unit notifies the identified name of the transmission side and a fact that the data is being received by the receiver and/or a receiving method by a voice so as to distinguish the direct reception for outputting the received image data while receiving and the memory reception for storing the received image data into a memory.

30 Claims, 20 Drawing Sheets

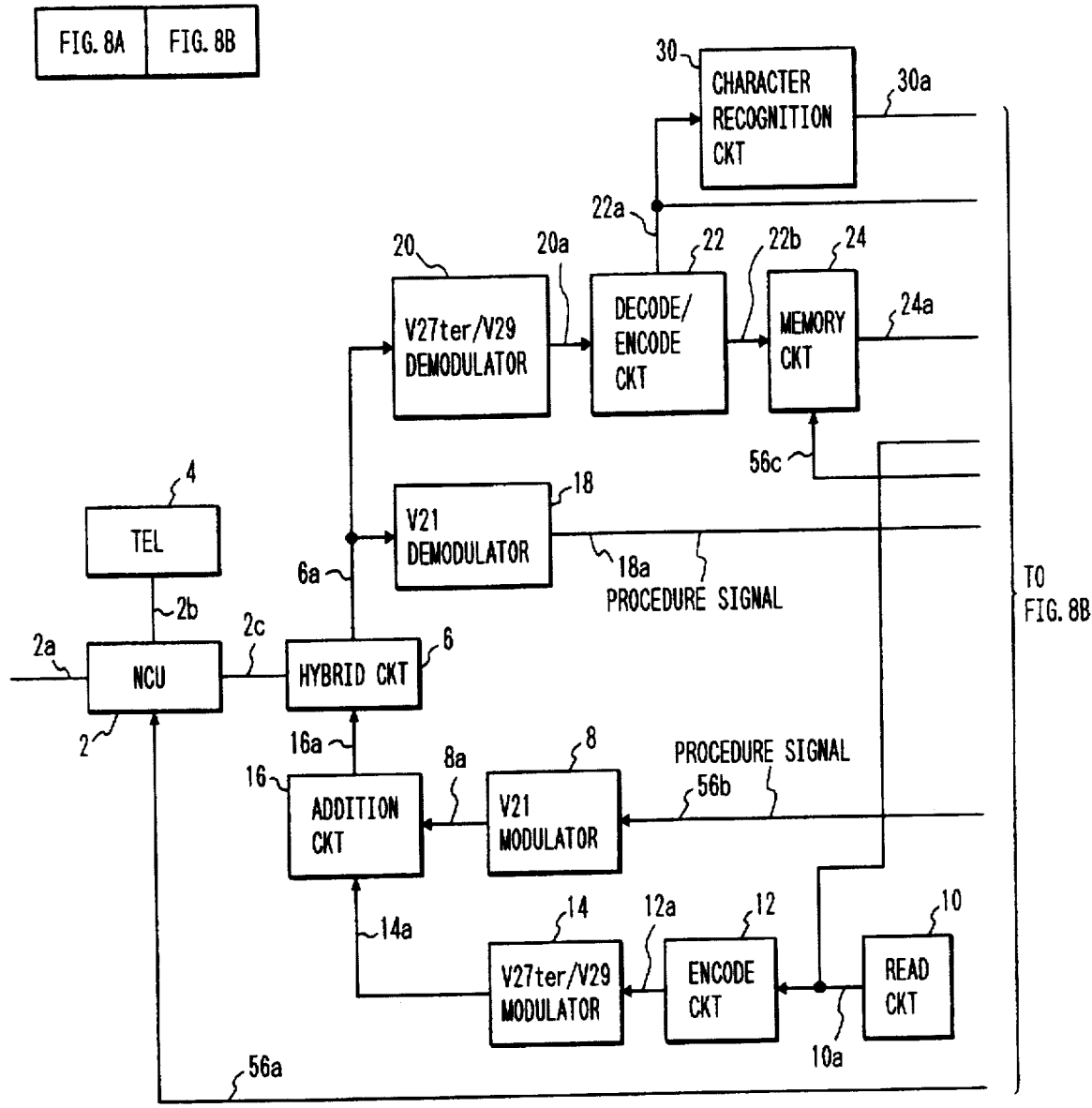

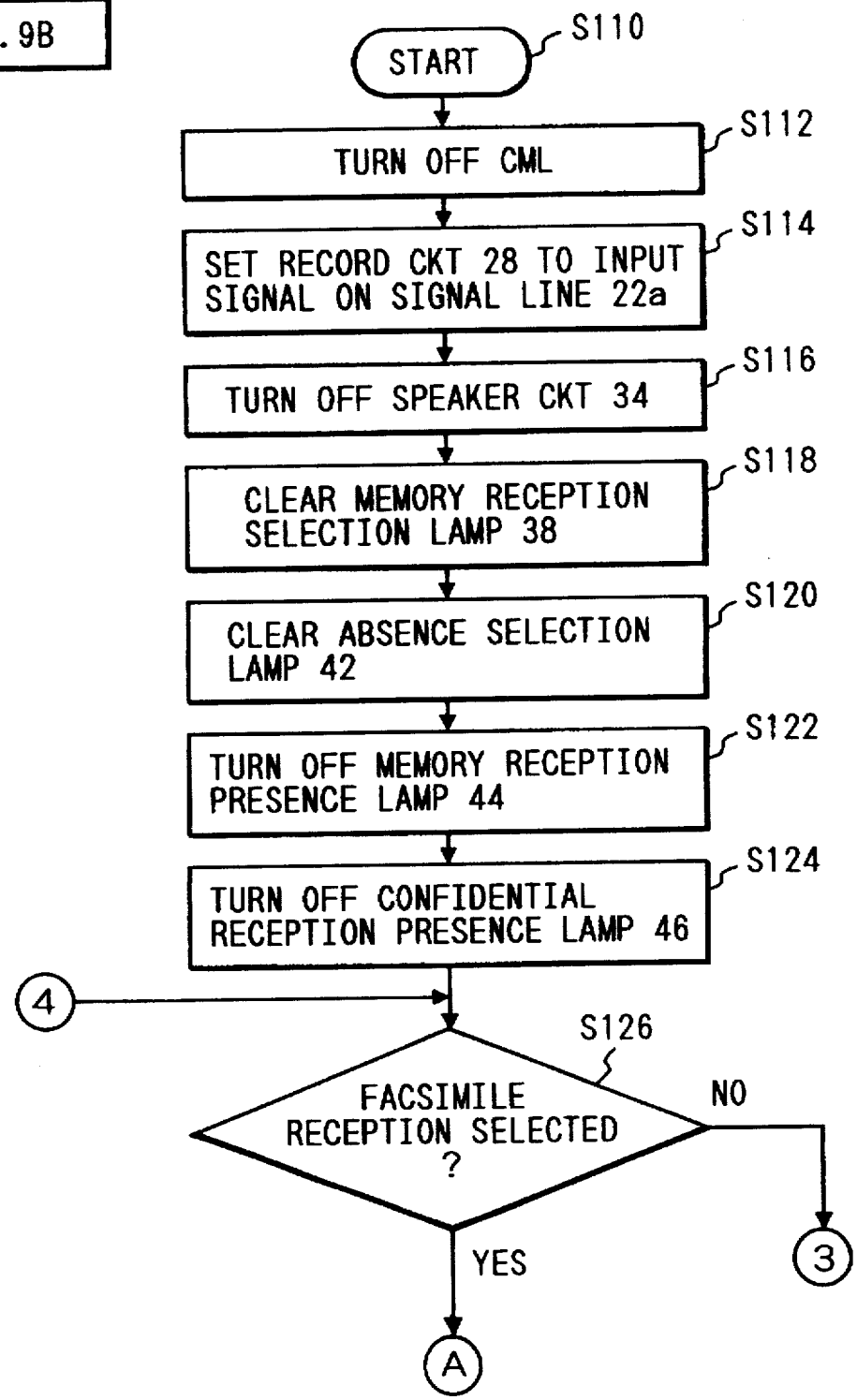

1

DATA COMMUNICATING APPARATUS HAVING USER NOTIFICATION CAPABILITY AND METHOD

BACKGROUND OF THE INVENTION

1. Field of the Invention

The invention relates to data communicating apparatus and method for receiving data from the transmission side.

2. Related Background Art

Hitherto, in a facsimile apparatus as a kind of data communicating apparatus for communicating data, when the data is received, as means for informing it to the user, there is known means for ringing a beep sound to inform the data reception, means for ringing an end sound indicative of the end of communication, or the like.

In the above conventional apparatus, however, the user who heard the beep sound or end sound cannot clearly know the contents indicated by such a sound. Therefore, there is a drawback such that it is very difficult to recognize what happened so long as he doesn't go to the apparatus. The user also cannot confirm from which place the received data was sent even if he merely listens to the beep sound or end sound.

SUMMARY OF THE INVENTION

The invention is made to solve the drawbacks of the conventional techniques mentioned above and it is an object of the invention to provide data communicating apparatus and method in which, when data from the transmission side is received, such a fact can be recognized to the user.

Another object of the invention is to provide data communicating apparatus and method in which, when data from the transmission side is received, a name of the transmission side can be recognized to the user.

Still another object of the invention is to provide data communicating apparatus and method which can identify a partner's name by a procedure signal of a facsimile apparatus and can notify it by a voice.

Further another object of the invention is to provide data communicating apparatus and method which can identify a partner's name from a partner's telephone number and can notify it by a voice.

Further another object of the invention is to provide data communicating apparatus and method which can recognize a reception of data from a desired partner.

Further another object of the invention is to provide data communicating apparatus and method which can distinguish and identify receiving methods.

Further another object of the invention is to provide data communicating apparatus and method which can easily recognize the occurrence of an error.

Further another object of the invention is to provide data communicating apparatus and method which can output received document contents by a voice.

Further another object of the invention is to provide data communicating apparatus and method which can output received document contents by a voice as necessary.

The above and other objects and features of the present invention will become apparent from the following detailed description and the appended claims with reference to the accompanying drawings.

DETAILED DESCRIPTION OF THE PREFERRED EMBODIMENTS

[First Embodiment]

An embodiment of the present invention will now be described hereinbelow with reference to the drawings.

Figure 1:
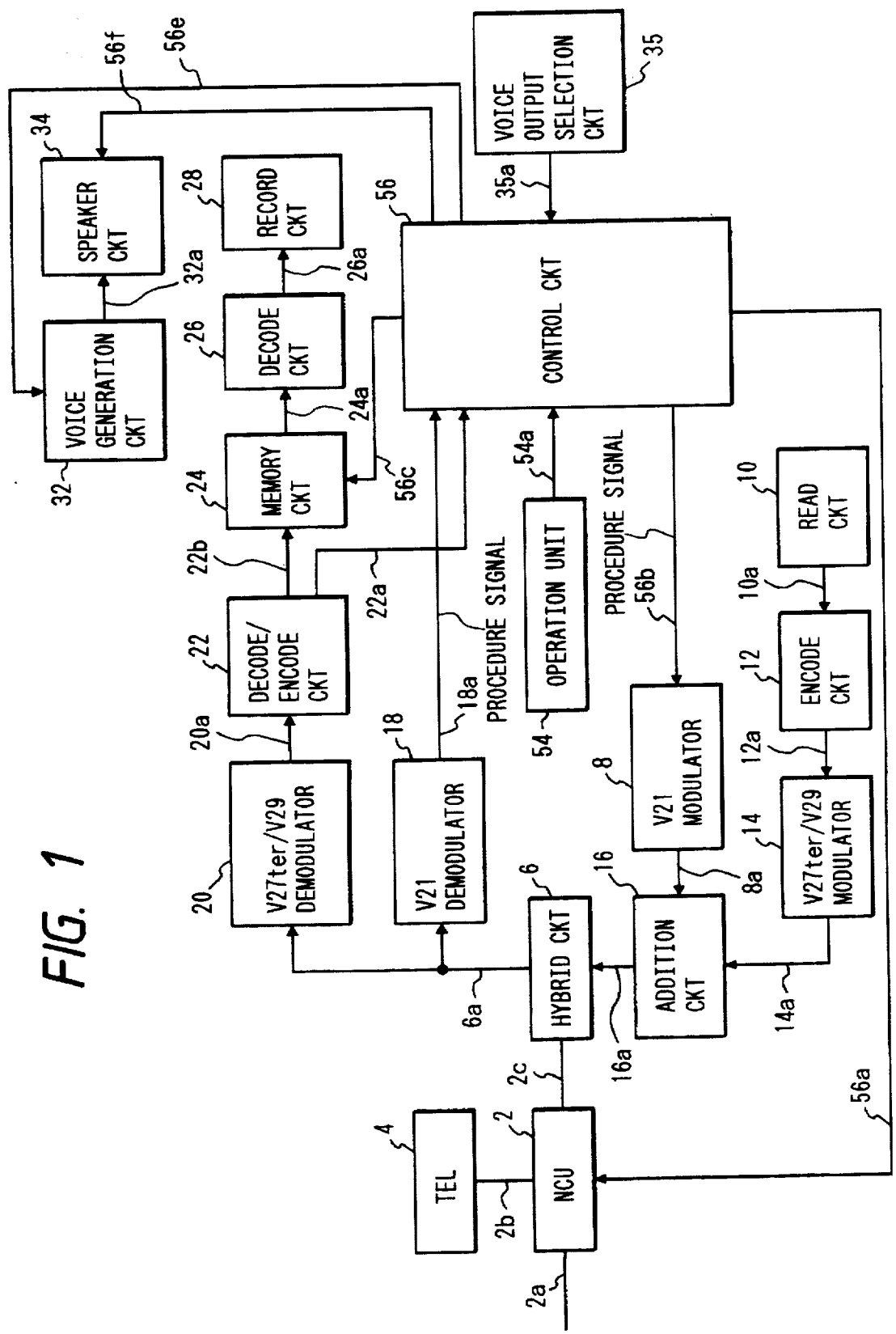
FIGS. 1 and 8 which is comprised of FIGS. 8A and 8B are block diagrams showing schematic constructions of data communicating apparatuses according to embodiments of the invention.

FIG. 1 is a block diagram showing a schematic construction of a facsimile apparatus as a data communicating apparatus according to an embodiment of the invention.

In order to use a telephone network for data communication or the like, an NCU (Network Control Unit) 2 is connected to a terminal of its telephone line, executes a connection control of the telephone exchange network, switches to a data communication path, and holds a loop. When a signal level (signal line 56a) from a control circuit 56 is set to "0", the NCU 2 connects a telephone line 2a to a telephone 4 side (2b). When the signal level is set to "1", the NCU 2 connects the telephone line 2a to a facsimile apparatus side (2c). The telephone line 2a is connected to the telephone 4 side in the ordinary state.

A hybrid circuit 6 separates a signal of a transmission system and a signal of a reception system and sends a transmission signal from an addition circuit 16 to the telephone line 2a via the NCU 2. The hybrid circuit 6 also receives a signal from the partner side via the NCU 2 and sends to a V27ter/V29 demodulator 20 and a V21 demodulator 18 via a signal line 6a.

A V21 modulator 8 is a modulator to execute a modulation based on the well-known ITU-T recommendation V21. The modulator 8 modulates a procedure signal (signal line 56b) from the control circuit 56 and sends to the addition circuit 16 through a signal line 8a.

A read circuit 10 sequentially reads image signals of one line in the main scanning direction from a transmission original, forms a signal train indicative of black and white binary values, and sends such data from a signal line 10a to an encode circuit 12. The read circuit 10 is constructed by an image pickup device such as a CCD (Charge Coupled Device) or the like and an optical system.

The encode circuit 12 inputs the read data outputted to the signal line 10a, executes an encoding [MH (Modified Huffman) encoding or MR (Modified Read) encoding] and outputs the encoded data from a signal line 12a.

A V27ter/V29 modulator 14 inputs the encoded data from the signal line 12a and executes the modulation based on the well-known ITU-T recommendation V27ter (differential phase modulation) or V29 (orthogonal modulation) and outputs the modulated data to the addition circuit 16 through a signal line 14a.

The addition circuit 16 is a circuit to add outputs of the modulators 8 and 14. An output of the addition circuit 16 is sent to the hybrid circuit 6 through a signal line 16a.

The V21 demodulator 18 executes a demodulation based on the well-known ITU-T recommendation V21. The demodulator 18 inputs a procedure signal from the hybrid circuit 6 by the signal line 6a and executes the V21 demodulation and sends the demodulated data to the control circuit 56 through a signal line 18a.

The V27ter/V29 demodulator 20 executes a demodulation based on the well-known ITU-T recommendation V27ter or V29. The demodulator 20 receives the modulated image signal from the hybrid circuit 6 and executes the demodulation and sends the demodulated data to a decode/encode circuit 22 through a signal line 20a.

The decode/encode circuit 22 inputs and decodes the demodulated data which was outputted to the signal line 20a and supplies the decoded data to a signal line 22a. The circuit 22 again executes the encoding of a parameter K=8 to the decoded data and outputs the encoded data to a signal line 22b.

A memory circuit 24 stores the encoded data outputted to the signal line 22b and sends the stored data to a decode circuit 26 through a signal line 24a on the basis of a control by a signal line 56c from the control circuit 56.

The decode circuit 26 is a circuit for decoding (MR decoding of K=8) the data from the signal line 24a and outputs the decoded data to a record circuit 28 through a signal line 26a.

The record circuit 28 inputs the data outputted to the signal line 26a and sequentially records one line by one.

A voice generation circuit 32 inputs code information such as an ASCII code or the like outputted to a signal line 56e and outputs voice information corresponding to the code information to a signal line 32a.

The voice generation circuit 32 has three methods as an output method of the voice information.

One of the three methods is a method of converting the inputted character code to the voice information one character by one and outputting. According to this method, the voice information of each character can be obtained.

Another method is a method of recognizing one word for the inputted character code and converting it into the voice information and outputting. According to this method, after one word was recognized, it is converted to the voice information, so that the fluent voice information can be obtained.

Still another method is a method of previously registering the voice information in correspondence to the code information and outputting the corresponding voice information when the code information is inputted. According to the method, when the registered code information is inputted, the necessary voice information can be outputted.

A speaker circuit 34 generates the audible voice information that is outputted to the signal line 32a. When the signal of the signal level "1" is outputted to a signal line 56f, the speaker circuit 34 is set into a state in which the voice information outputted to the signal line 32a is generated as an audible sound. When the signal of the signal level "0" is outputted to the signal line 56f, the speaker circuit 34 doesn't generate the voice information outputted to the signal line 32a as an audible sound.

A voice output selection circuit 35 selects a voice outputting timing when a reception of facsimile information is notified by a voice. The selection circuit 35 selects either one of a mode for notifying the reception by a voice when the reception of the facsimile information is started, namely, when NSS/TSI/DCS signals of procedure signals are received in a pre-procedure in a facsimile communication and a mode for notifying the reception by a voice when the reception of the facsimile information of one communication is finished. The selection circuit 35 outputs the selection result to a signal line 35a.

An operation unit 54 has one-touch dial keys, abbreviation dial keys, ten-key, set key, various registration keys, start key, stop key, and other function keys. When one of those keys is depressed, the operation key 54 outputs key information corresponding to the depressed key to a signal line 54a.

The control circuit 56 is a circuit to control each section of the apparatus. The control circuit 56 has an ROM (Read Only Memory) and an RAM (Random Access Memory). A program to make the apparatus operative has been stored in the ROM. The control circuit 56 controls each operation on the basis of the program. The RAM is used as a work area by the control circuit and can temporarily store various data.

According to the embodiment with a construction as mentioned above, in the case where an NSS (Non•Standard Facilities Set-up) is received in the pre-procedure in the facsimile communication, so long as transmission-source information on the transmitting side is included in the fourth and subsequent bytes (free area) of an FIF (Facsimile Information Field) of the NSS, it is converted to voice information and is voice-outputted. The reception of such voice information is notified.

Figure 2:
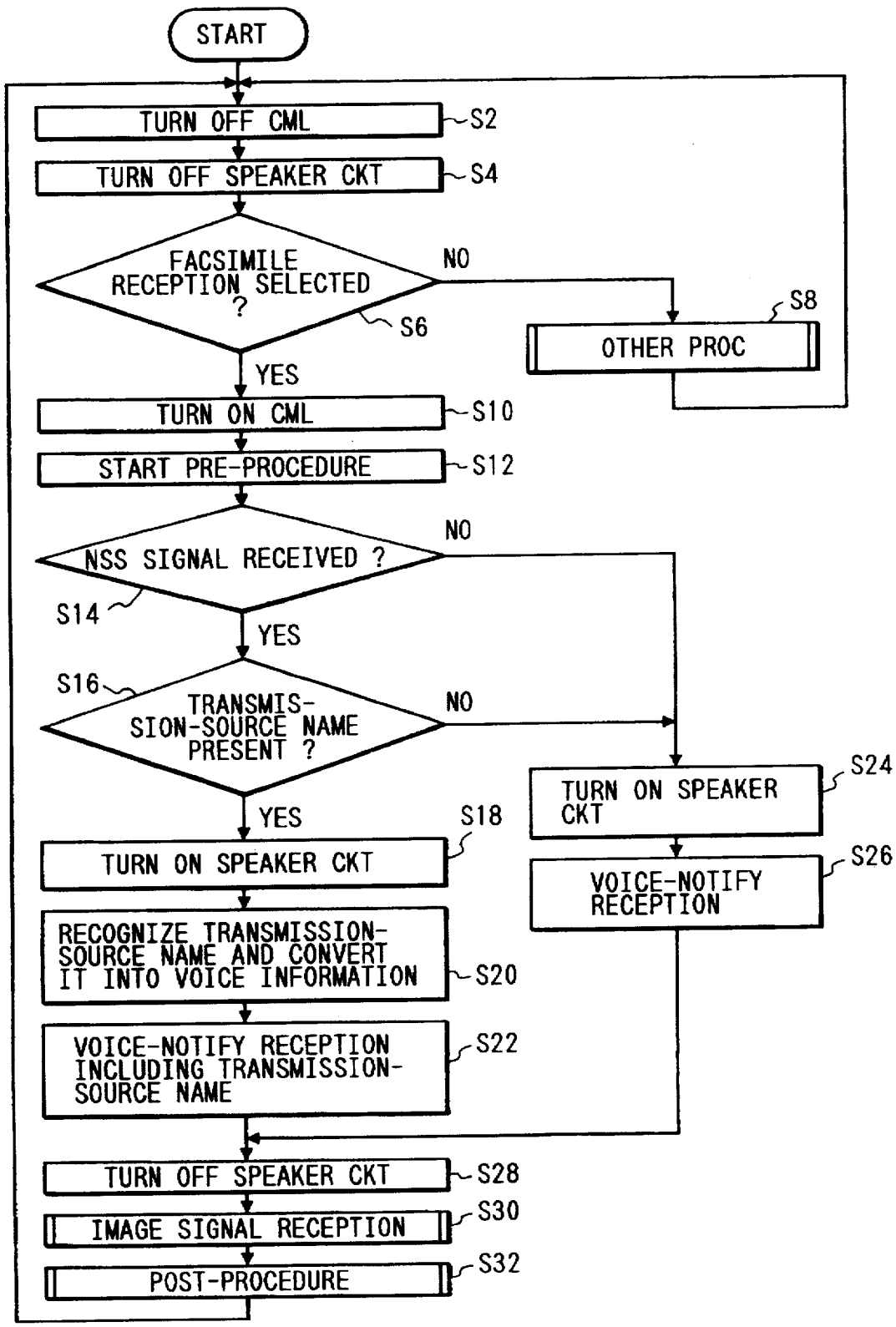
FIGS. 2 to 7 and 9, which is comprised of FIGS. 9A and 9B, to 19 are flowcharts showing flows of the operation of the data communicating apparatus of the embodiment of the invention.

A flow of processes in the embodiment will now be described hereinbelow with reference to a flowchart of FIG. 2. First in step S2, the signal of the signal level "0" is outputted to the signal line 56a and a CML (Connect Modem to Line) is turned off. In step S4, the signal of the signal level "0" is outputted to the signal line 56f and the speaker circuit 34 is turned off.

In step S6, a check is made to see if the facsimile reception has been selected or not. When it is selected, step S10 follows. If NO, step S8 follows and another process is executed.

In step S10, the signal of the signal level "1" is outputted to the signal line 56a and the CML is turned on, thereby connecting the telephone line 2a to the signal line 2c. In step S12, a transmission preprocedure in the facsimile communication is started.

In step S14, a check is made to see if the transmission side has transmitted an NSS signal or not, namely, whether the NSS signal has been received or not. If the NSS signal is not received, step S24 follows. If it is received, step S16 follows and a check is made to see if the transmission-source information is included in the received NSS signal or not. Since the fourth and subsequent bytes of the FIF of the NSS signal are set to an area which can be freely used by each manufacturer, it is predetermined so as to send the transmission-source information such as a transmission-source name or the like by, for example, code information such as a JIS code or the like by using such an area. In step S16, a check is made to see if the code information as a transmission-source name is included here or not. If there is a transmission-source name, step S18 follows. If NO, step S24 follows.

In step S18, the signal of the signal level "1" is outputted to the signal line 56f. The speaker circuit is turned on. In step S20, the code information as received transmission-source name is converted into the voice information one character by one. Subsequently, in step S22, voice information to inform the user of a fact that the facsimile image information from ( ) ( ) will be received from now on such that "There is a facsimile reception from ( ) ( ) [recognized transmission-source name]." while including the transmission-source name that was converted to the voice information is outputted to the signal line 56e. Those information is outputted as an audible voice by the speaker circuit 34.

On the other hand, when the NSS signal is not received in step S14 or when the transmission-source name is not received in step S16, the signal of the signal level "1" is outputted to the signal line 56f in step S24 and the speaker circuit is turned on. Subsequently in step S26, voice information to inform the user of a fact that the facsimile image information will be received from now on such that "There is facsimile reception." is outputted to the signal line 56e. Those information is outputted as an audible voice by the speaker circuit Since the message "There is a facsimile reception." is common information irrespective of the partner side, it is stored as fixed information in the ROM and is read out as necessary. When the transmission-source name can be identified, "from" and the above common information "There is a facsimile reception." are read out from the ROM and the transmission-source name is first added and a message indicating "There is a facsimile reception from ( ) ( )." is outputted as an audible voice.

In step S28, the signal of the signal level "0" is outputted to the signal line 56f and the speaker circuit is turned off. In step S30, the image signal is received. In step S32, a post-procedure of the transmission in the facsimile communication is executed and the processing routine is finished.

According to the first embodiment as mentioned above, in case of receiving the facsimile image information, since it is notified by a voice, the user can certainly recognize the execution of the facsimile reception. In the case where the partner's name can be recognized, it is also notified by a voice. Therefore, the user can certainly recognize from which partner the facsimile reception is performed.

In the embodiment, although the transmission-source name has been converted to the voice information one character by one, the invention is not limited to such an example but can also use the other two methods mentioned above.

[Second Embodiment]

In the above first embodiment, after the presence or absence of the NSS signal was judged, the voice notification is executed before the end of the reception of the image information. However, such a voice notification can be also performed after the end of the facsimile reception.

Figure 3:
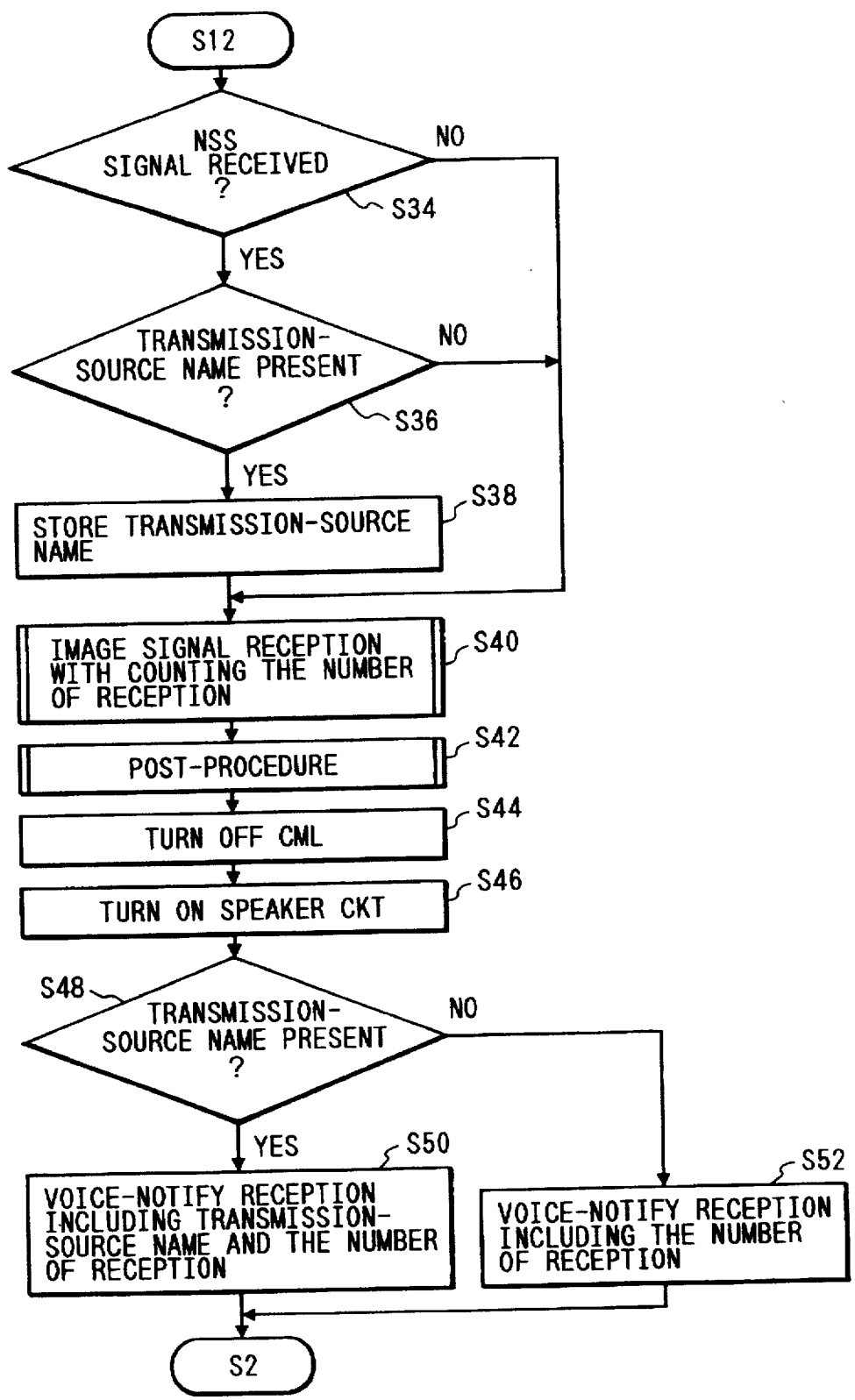

FIG. 3 is a flowchart showing portions different from those of the first embodiment in the operation in such a case. A flow of processes in the second embodiment will now be described hereinbelow with reference to the flowchart shown in FIG. 3.

In step S34, a pre-procedure is started and a check is made to see if the NSS signal has been received or not. If the NSS signal is received, step S36 follows. If NO, step S40 follows.

In step S36, a check is made to see if the code information indicative of the transmission-source name is included in the received NSS signal or not. If YES, step S38 follows and the code information as such a transmission-source name is stored in the RAM. If NO, step S40 follows.

In step S40, the reception of the image information is started and by counting up a page counter each time one page is received, the number of received pages is counted and stored into the RAM. After completion of the reception, a post-procedure is performed in step S42. In step S44, the signal of the signal level "0" is outputted to the signal line 56a and the CML is turned off.

In step S46, the signal of the signal level "1" is outputted to the signal line 56f and the speaker circuit 34 is turned on. Subsequently in step S48, a check is made to see if there is a transmission-source name or not, namely, whether the code information has been stored as a transmission-source name in the RAM or not. If YES, step S50 follows and the transmission-source name and the number of received pages are converted to the voice information. Voice information to inform the user of a fact that the reception of < > < > facsimile image information from ( ) ( ) is finished such that "< > < > facsimile images were received from ( ) ( )." while including those voice information as in the foregoing first embodiment is outputted from the speaker circuit 34 as an audible sound.

On the other hand, when there is no transmission-source name in step S48, step S52 follows and voice information to inform the user of a fact that the reception of < > < > facsimile image information is finished such that "< > < > facsimile images were received." is outputted by the speaker circuit 34 as an audible sound.

According to the second embodiment as mentioned above, the user can certainly recognize the end of the facsimile reception and can also recognize the number of pages of the reception data. When the partner's name can be recognized, it is also notified by a voice. Therefore, the user can certainly recognize from which partner the facsimile image information was received. Such voice information can be outputted at a desired one of the timings of the user in the first and second embodiments by the selecting circuit 35.

[Third Embodiment]

Although the transmission-source name has been identified by the NSS signal in the foregoing first and second embodiments, the partner side to be voice-outputted can be also registered on the reception side in correspondence to the telephone number. In this case, for example, a desired telephone number is inputted from the ten-key of the operation unit 54 and a key of a character code (transmission-source name) to be voice-outputted is inputted in correspondence to the telephone number or the actual voice (transmission-source name) is recorded and inputted, thereby registering such a partner. The partner side can be also made correspond to the one-touch key or abbreviation dial key for transmission. When the telephone number registered in this way is detected, the corresponding voice information (transmission-source name) is voice-outputted as an audible sound.

Figure 4:
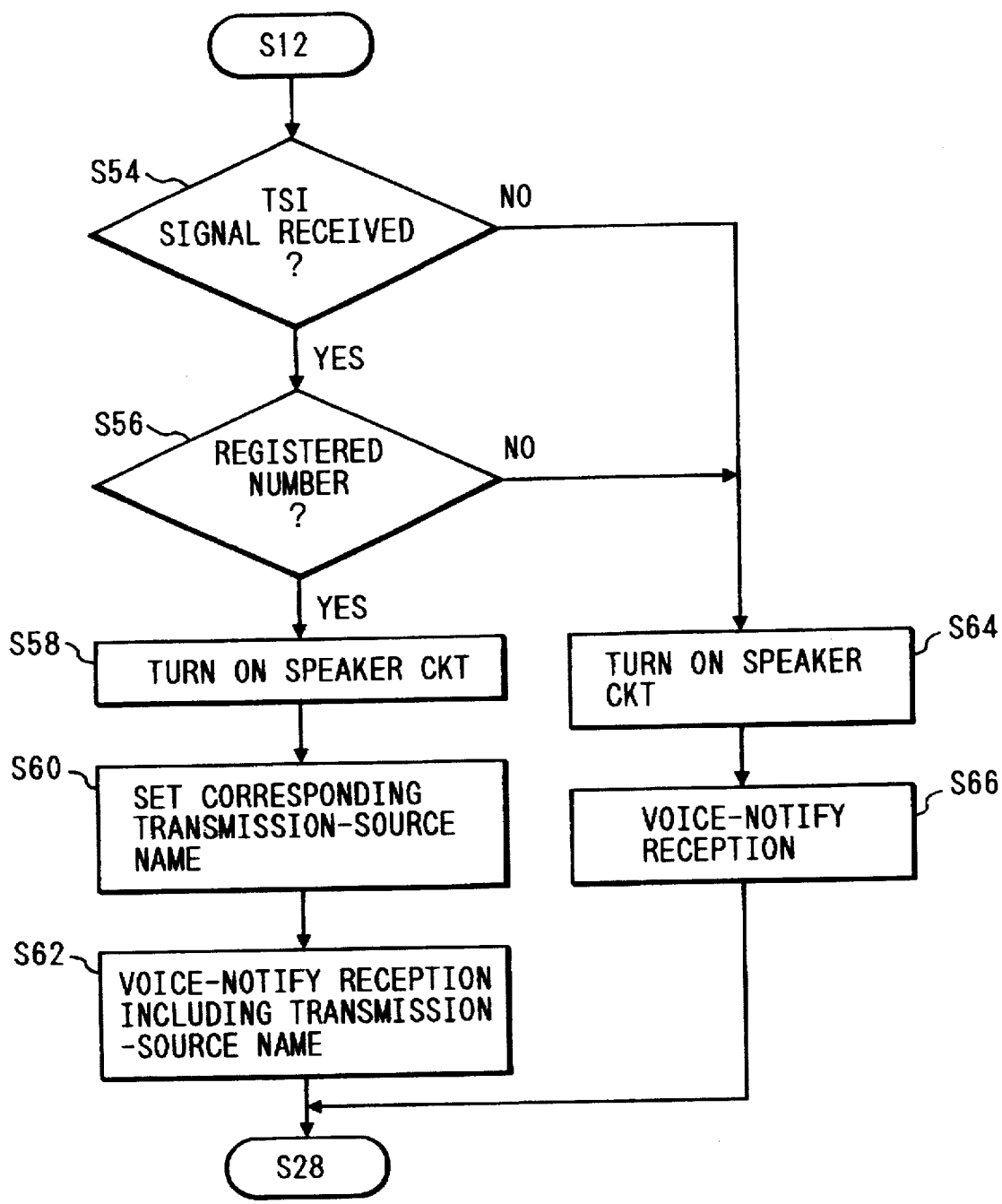

FIG. 4 is a flowchart showing portions different from those in the first embodiment in the operation in such a case. A flow of processes according to the third embodiment will now be described hereinbelow with reference to the flowchart shown in FIG. 4.

In step S54, a pre-procedure is started and a check is made to see if a TSI (Transmitting Subscriber Identification) signal has been received or not. If the TSI signal is received, step S56 follows. If NO, step S64 follows.

In step S56, a check is made to see if the telephone number in the received TSI signal corresponds to the telephone number which has previously been registered or not. If YES, step S58 follows. If NO, step S64 follows.

In step S58, the signal of the signal level "1" is outputted to the signal line 56f and the speaker circuit 34 is turned on. The transmission-source name which has been stored in correspondence to the telephone number in the received TSI signal is set into the RAM. In step S62, voice information to inform the user of a fact that the facsimile image information from ( ) ( ) is received such that "There is a facsimile reception from ( ) ( ) [transmission-source name]" is outputted from the speaker circuit 34 as an audible sound in a manner similar to the foregoing embodiments.

On the other hand, when the TSI signal is not received in step S54 or when it is judged that the telephone number doesn't coincide with the registered telephone number in step S56, the speaker circuit 34 is turned on in step S64. In step S66, voice information to inform the user of a fact that the facsimile image information is received such that "There is a facsimile reception." is outputted from the speaker circuit 34 as an audible sound.

According to the third embodiment as mentioned above, the partner's telephone number is detected by the TSI signal which can be used in a communication among the apparatuses of different manufacturers is detected and a fact that the facsimile reception is being executed while including the transmission-source name corresponding to such a telephone number is notified by a voice. Therefore, the user can certainly recognize that the facsimile reception is executed from a desired partner side of the user.

[Fourth Embodiment]

The method of registering the transmission-source name to be voice-outputted in correspondence to the partner's telephone number as in the third embodiment can be also applied to the foregoing second embodiment.

Figure 5:
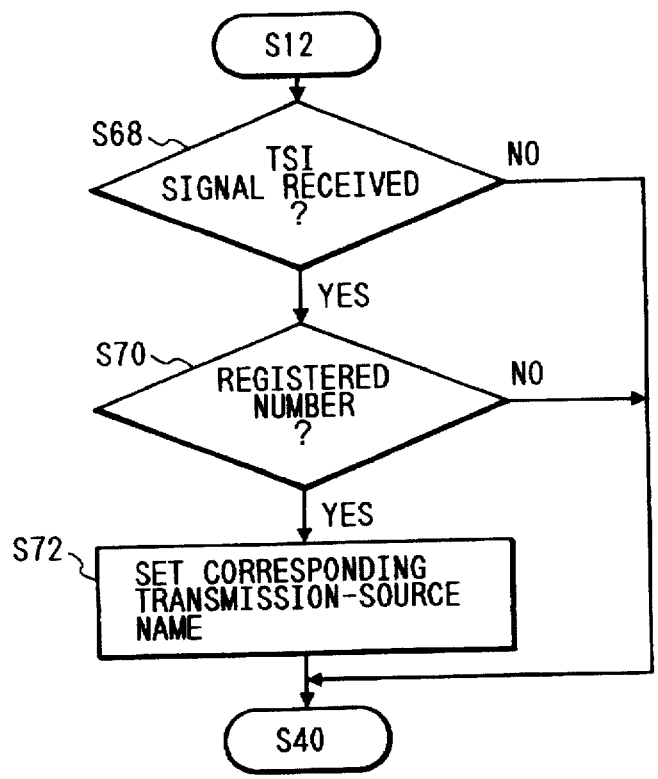

FIG. 5 is a flowchart showing portions different from those in the second embodiment in the operation in such a case. A flow of processes according to the fourth embodiment will now be described hereinbelow with reference to the flowchart shown in FIG. 5.

In step S68, a pre-procedure is started and a check is made to see if the TSI signal has been received or not. If the TSI signal is received, step S70 follows. If NO, step S40 follows.

In step S70, a check is made to see if the telephone number in the received TSI signal coincides with the telephone number that has previously been registered or not. If YES, step S72 follows. If NO, step S40 follows.

In step S72, the transmission-source name which has been stored in correspondence to the telephone number in the received TSI signal so as to be voice-notified by a message such that "< > < > [the number of received pages] facsimile pages were received from ( ) ( ) [transmission-source name]." is set into the RAM after all of the facsimile image information was received. The processing routine advances to the reception of the facsimile image signal in step S40. On the other hand, when the TSI signal is not received in step S60 or when it is judged in step S70 that the telephone number doesn't coincide with the registered telephone number, the processing routine directly advances to the reception of the facsimile image signal in step S40.

According to the fourth embodiment as mentioned above, in the case where there is a facsimile reception from the partner which has previously been registered, the partner's name and the number of received pages are included and communicated by the voice. Therefore, a fact that the facsimile reception was performed from the desired partner can be certainly recognized. Such voice information can be also outputted at a desired one of the timings of the user in the third and fourth embodiments as an audible sound by the selecting circuit 35.

[Fifth Embodiment]

In the foregoing second and fourth embodiments, the reception has been notified irrespective of the receiving method. However, in order to distinguish from the case of performing the direct reception such that the image data is outputted while receiving, a receiving method such as ". . . memory reception was performed." or ". . . confidential reception was performed." can be also together notified in accordance with the receiving method. With such a method, in case of the memory reception or confidential reception, it is possible to promote the user to record and output the received image data to a recording paper, so that it is possible to prevent that the memory capacity is filled with the received data.

Or, in case of the occurrence of an error such as absence of the recording paper, occurrence of a paper jam, or the like, it is also possible to report an error by a message such as "There is no paper. Please supplement the paper." or "A paper jam occurs. Please check it." and to rapidly cope with such an error.

Figure 6:
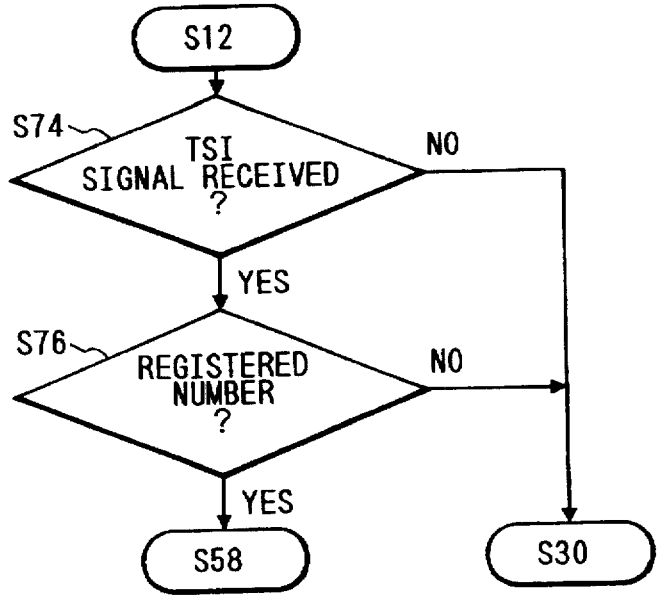

In the above third and fourth embodiments, the voice-output has been also performed even in the case where the facsimile reception was executed from a partner other than the registered partner. However, it is also possible not to voice-output the reception from a partner other than the registered partner, thereby enabling the reception from a desired partner to be more certainly recognized. FIG. 6 is a flowchart showing the operation in such a case. That is, when the TSI signal is not received in step S74 or when it is judged in step S76 that the telephone number doesn't coincide with the registered number, step S30 follows. The reception of the image signal is started without notifying the reception by a voice. Although the flowchart has been described with respect to the case where it is applied to the third embodiment, even in the case of applying to the fourth embodiment, it is sufficient not to voice-notify a reception other than the reception from the partner of the registered telephone number in a manner similar to the above.

[Sixth Embodiment]

Figure 7:
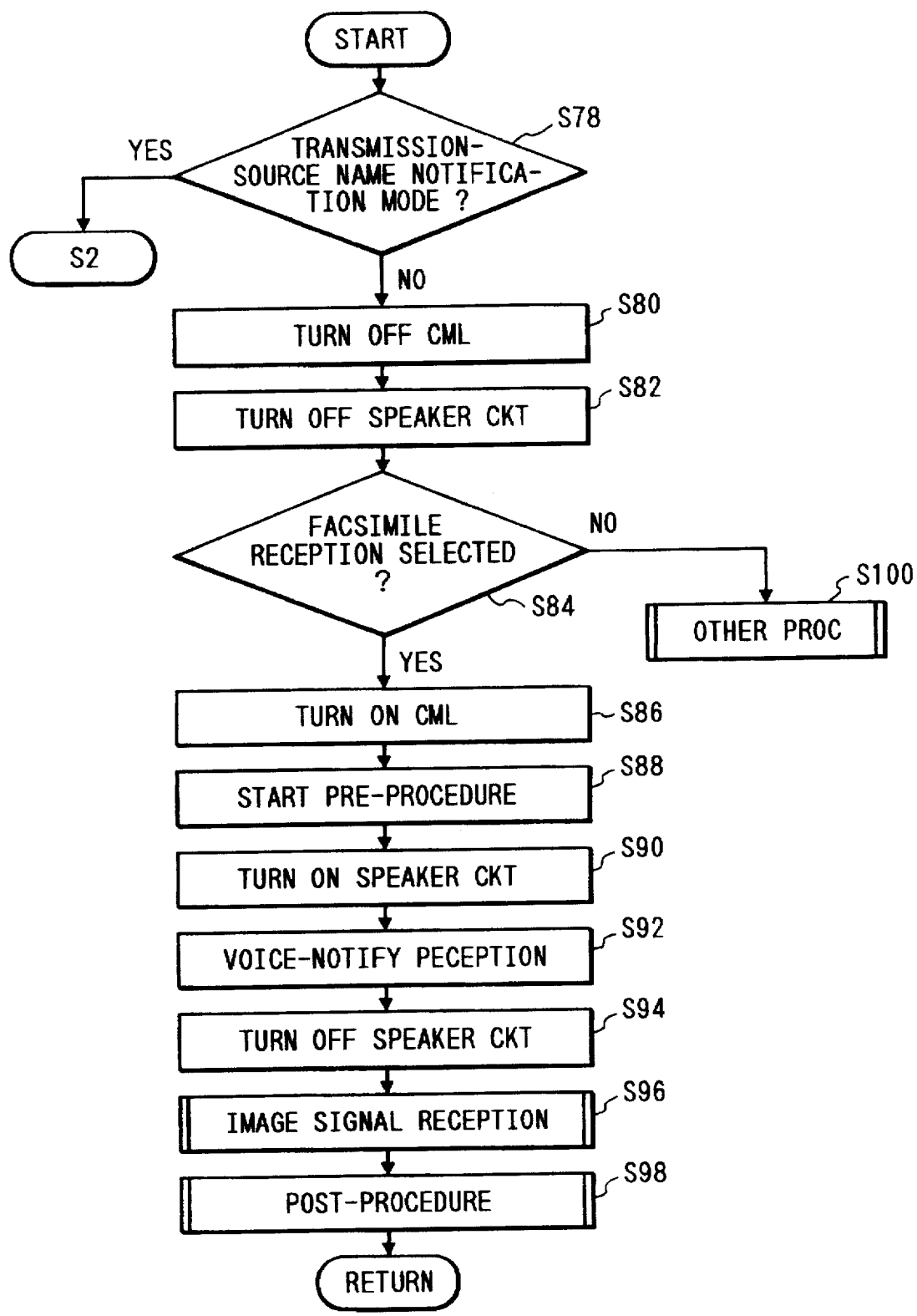

It is also possible to select either one of a mode for receiving irrespective of the partner or for notifying only a fact that the reception was performed and a mode for notifying the transmission-source name by either one of the methods of the foregoing embodiments. FIG. 7 is a flowchart showing the operation in such a case. Namely, in step S78, a check is made to see if the control mode is the mode for notifying by a voice in the case where the transmission-source name could be identified or the mode for notifying by a voice a fact that the reception is performed irrespective of the reception from anywhere. It is assumed that such a mode is preset by the user from the operation unit 54. In case of the mode for notifying the transmission-source name, step S2 follows and the process is executed in accordance with either one of the foregoing embodiments. In case of the mode for notifying by a voice only a fact that the reception is performed, step S80 follows and the ordinary facsimile receiving process is executed hereinbelow. When a pre-process is started in step S88, a message such as "There is a facsimile reception." is voice-notified. A reception end can be also voice-notified by a message such as "< > < > facsimile images were received." after completion of the reception of the image signal. With such a method, the presence of the reception or only a fact that the reception was performed can be notified as necessary and a load of the processes can be reduced.

According to the embodiment as described above, since various information has been voice-outputted as an audible sound, the user can certainly recognize various information.

According to the invention as described above, when data from the transmission side is received, it can be certainly recognized by the user.

According to the invention, in the case where the data from the transmission side is received, from which place the data was received can be recognized by the user.

[Seventh Embodiment]

Although the partner has been identified by using the procedure signal in the facsimile communication and has been notified by the voice in the foregoing embodiment, it is also possible to recognize the received document and to voice-output it. Processes in such a case will now be described hereinbelow.

Figure 8B:
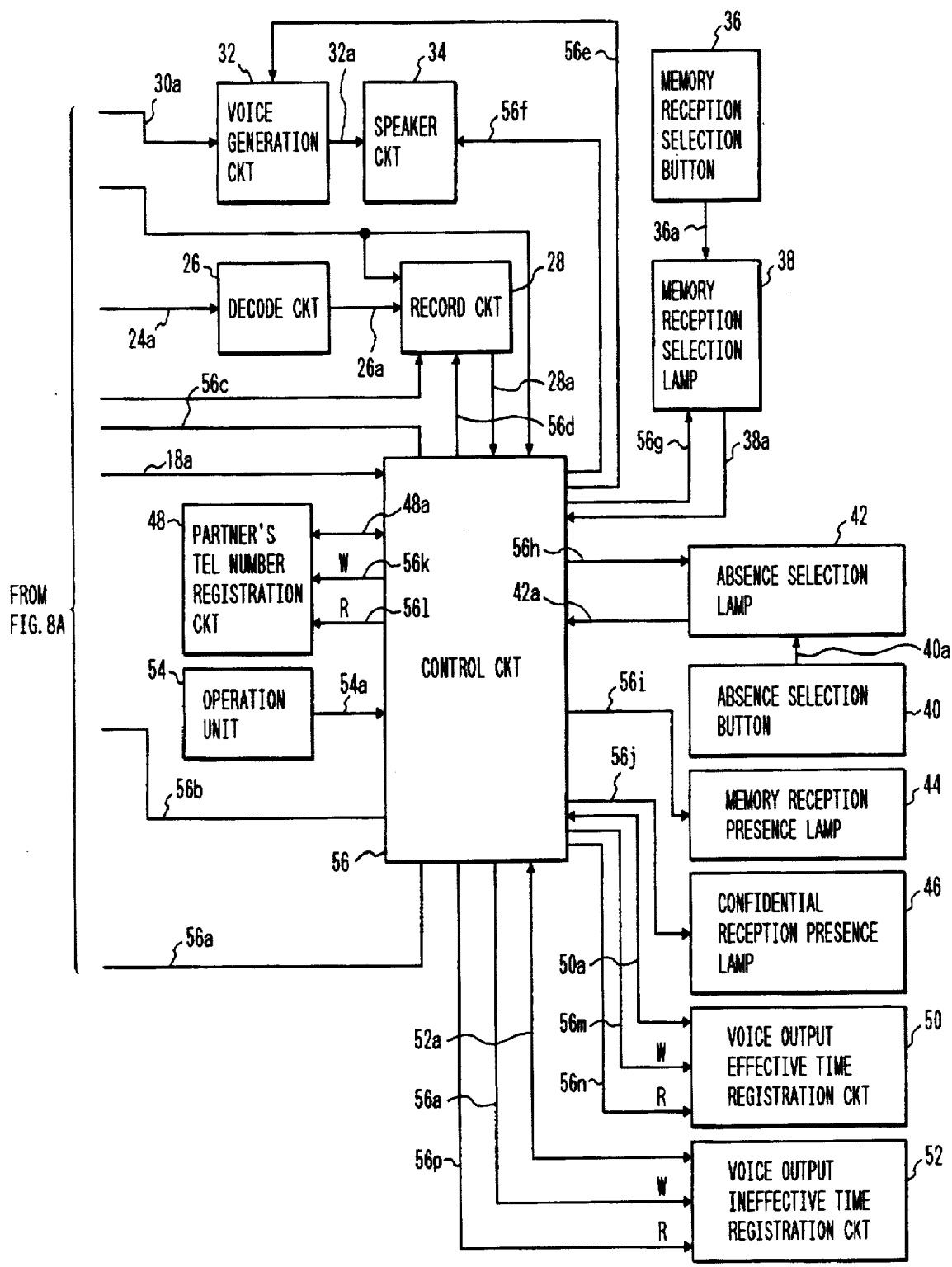
Figure 9B:
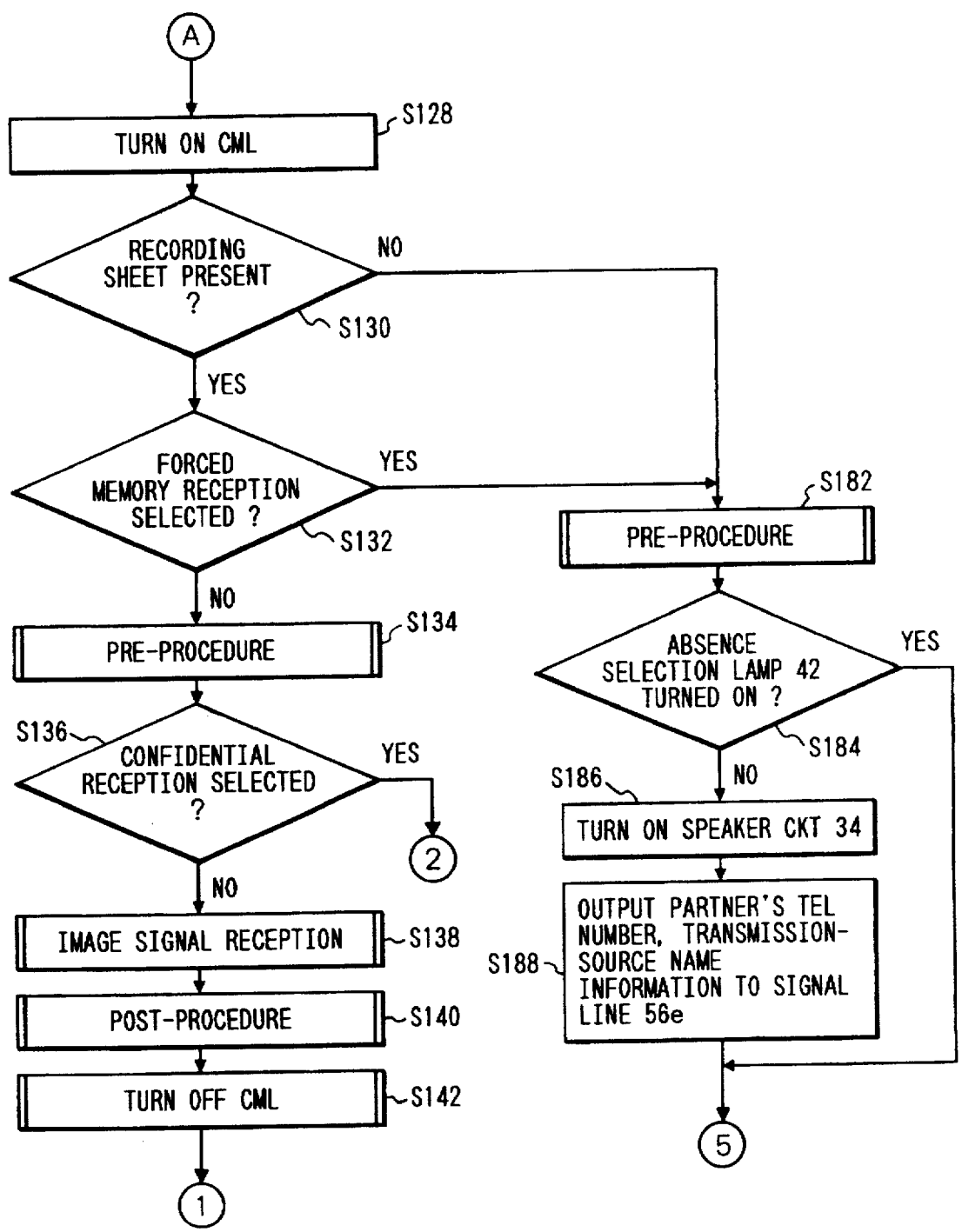
Figure 10:
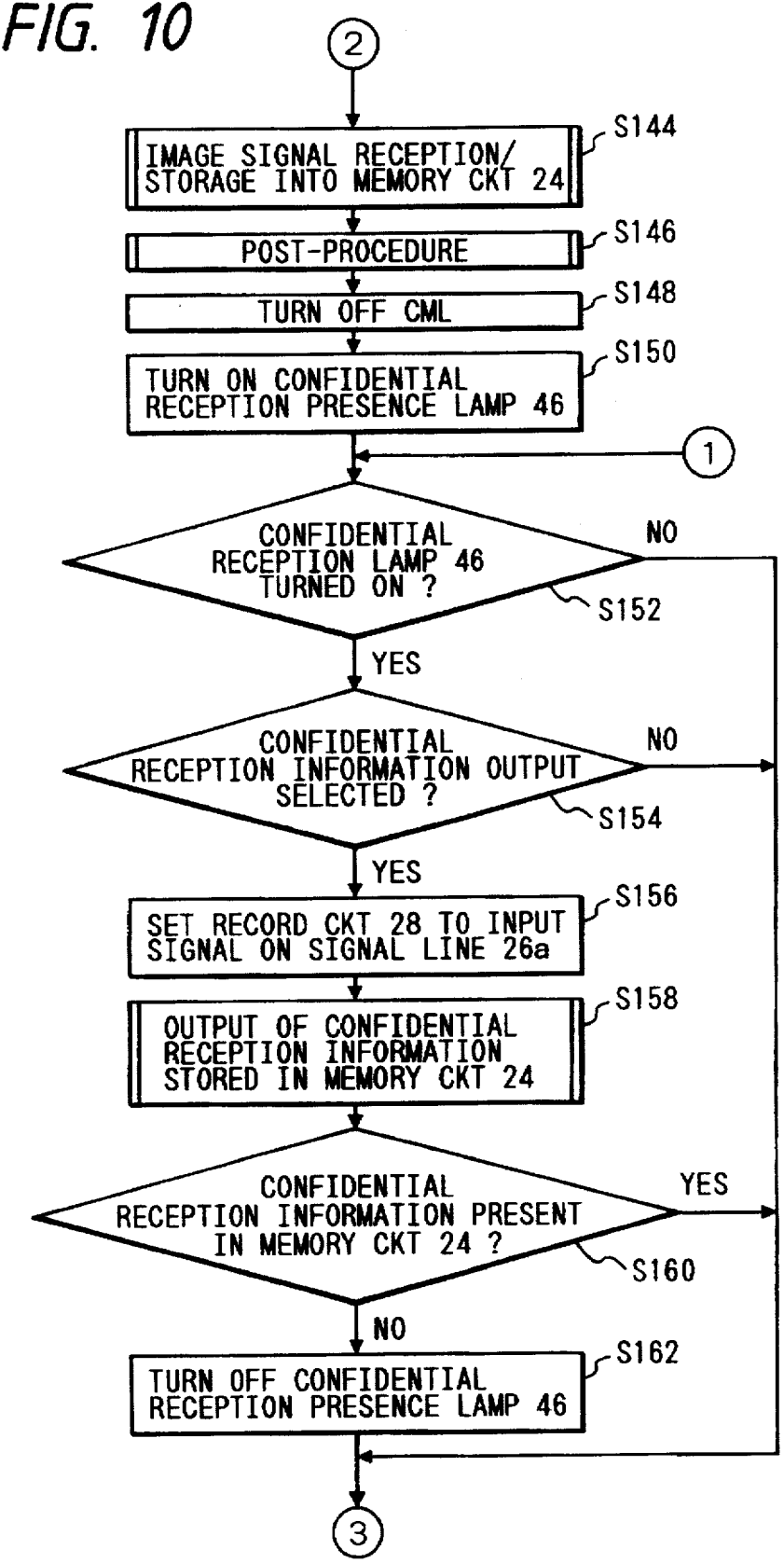
Figure 11:
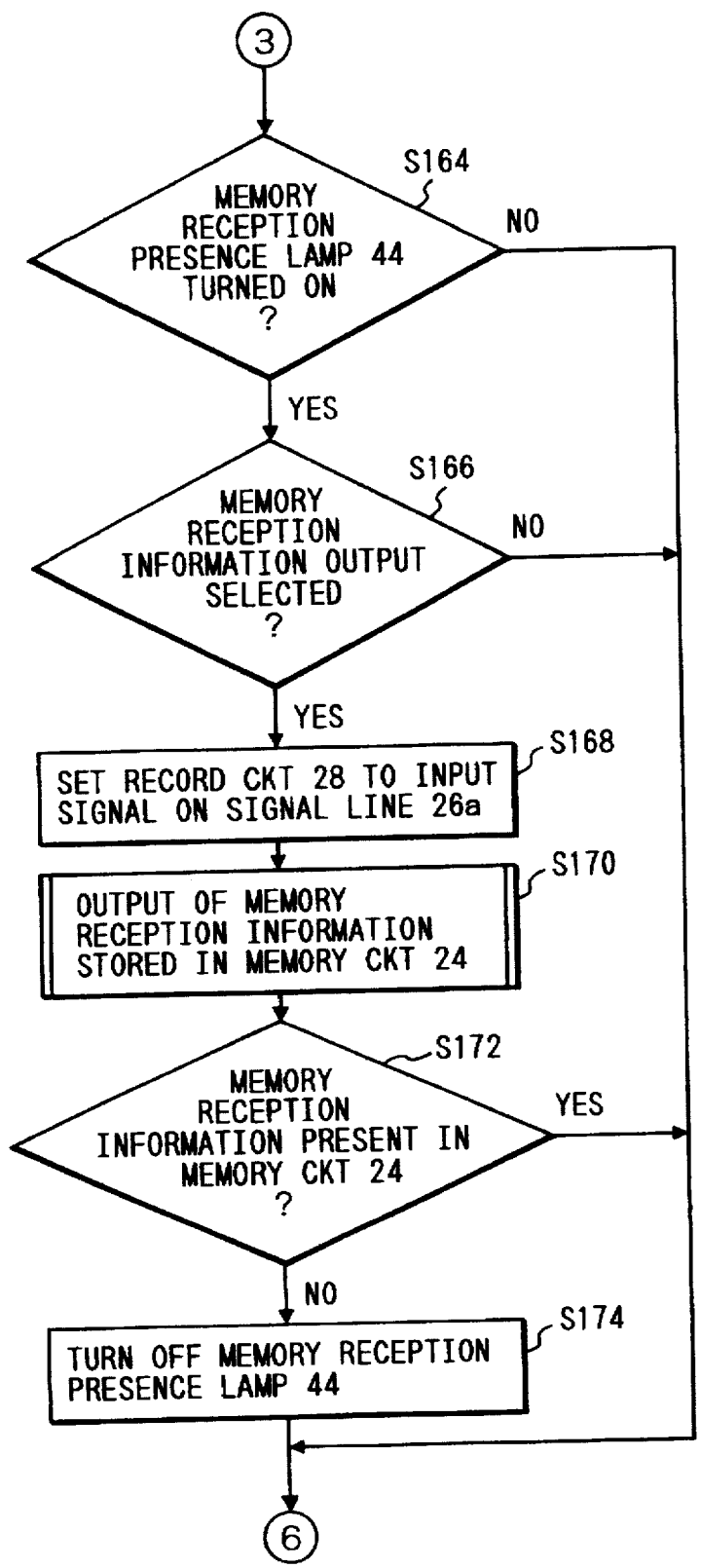
Figure 12:
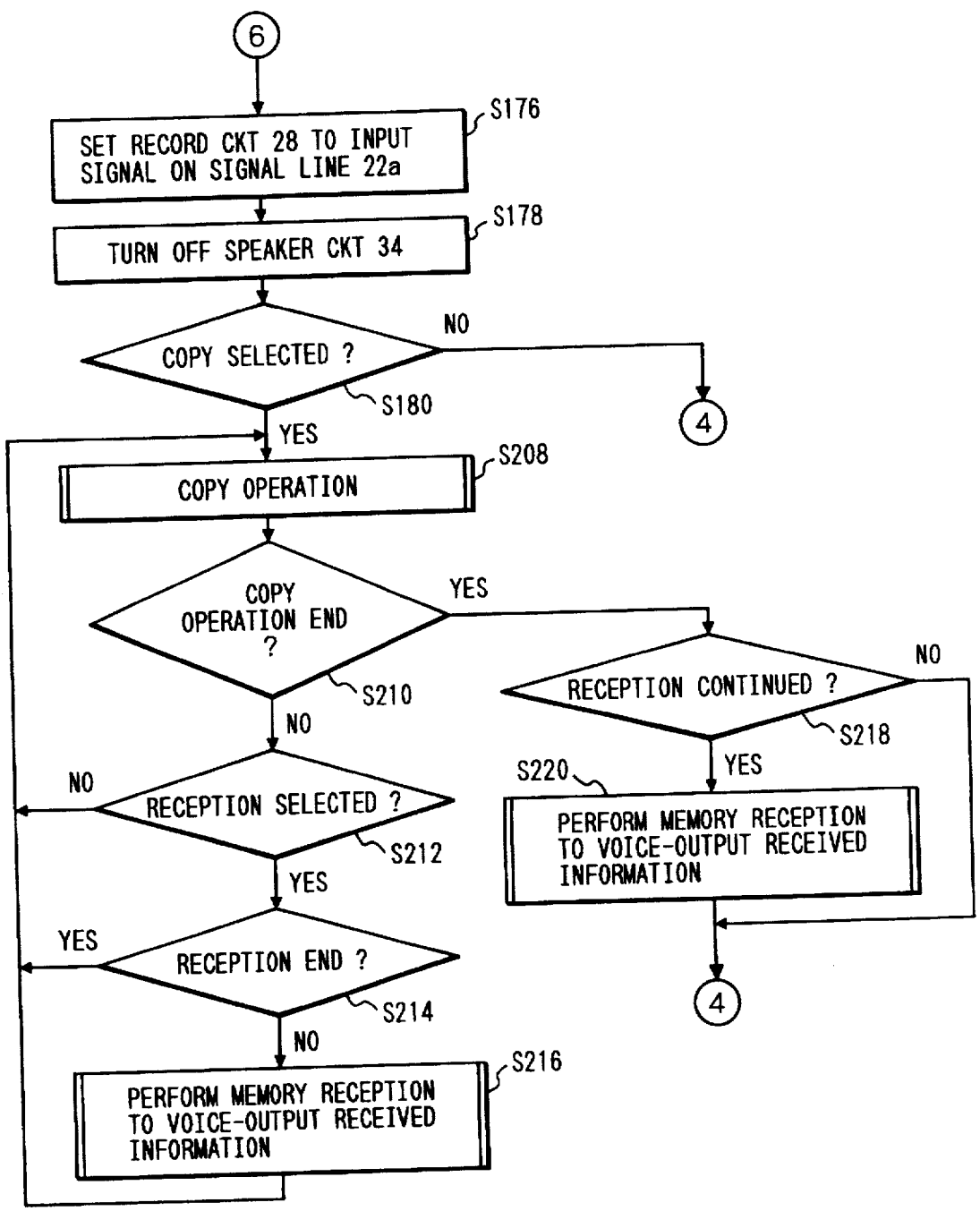
Figure 13:
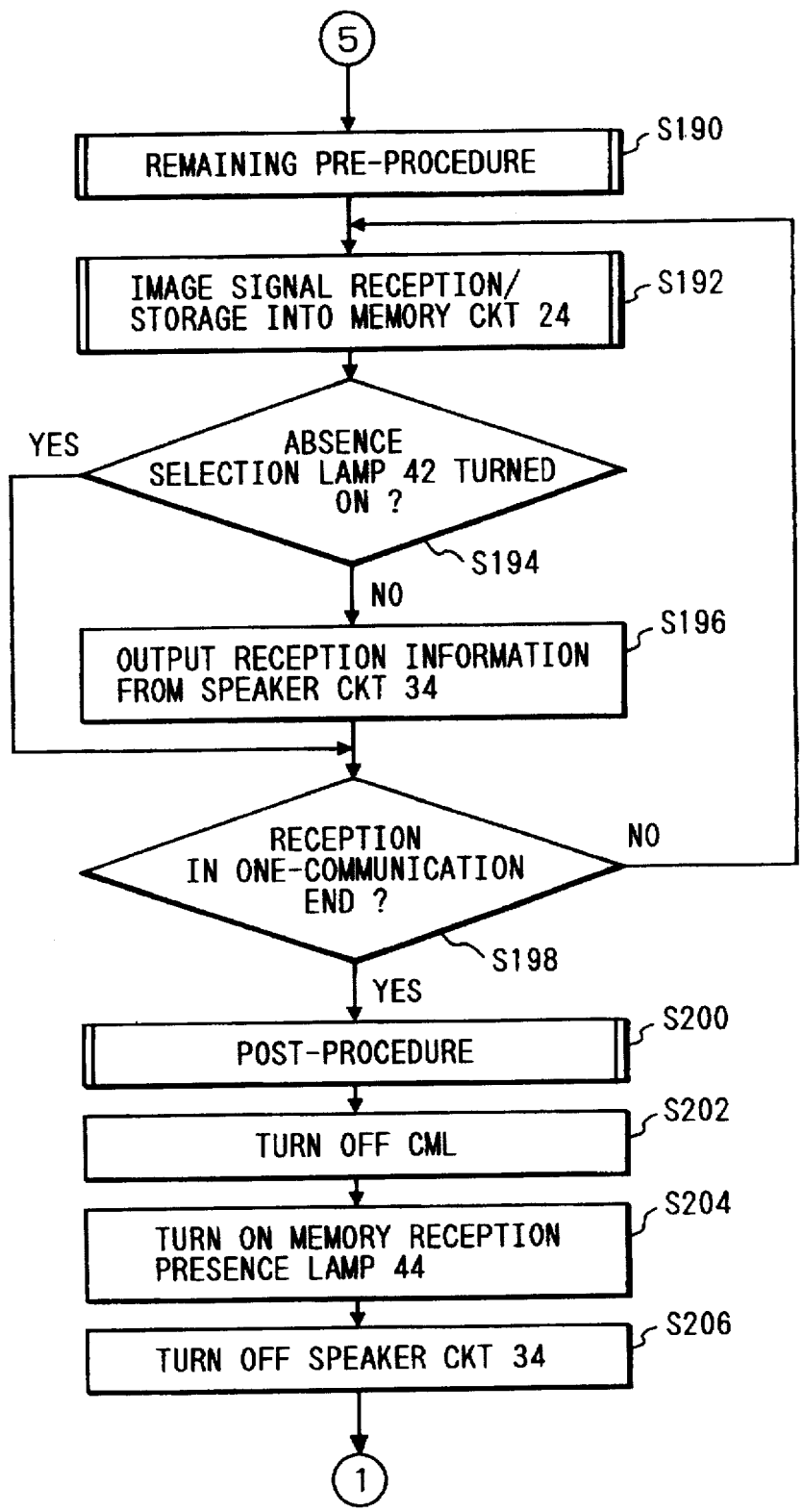

FIGS. 8A and 8B are block diagrams showing a schematic construction of a facsimile apparatus as a data communicating apparatus according to the embodiment in such a case. The portions having functions similar to those in FIG. 1 are designated by the same reference numerals and their descriptions are omitted here.

In FIGS. 8A and 8B, when the signal of the signal level "0" is outputted from the control circuit 56 to a signal line 56d, the record circuit 28 inputs the data outputted to the signal line 26a. When the signal of the signal level "1" is outputted to the signal line 56d, the record circuit 28 inputs the data outputted to the signal line 22a. When the signal of the signal level "2" is outputted to the signal line 56d, the record circuit 28 inputs the data outputted to the signal line 10a. Those input signals are sequentially recorded one line by one.

A character recognition circuit 30 inputs the decoded data outputted to the signal line 22a, recognizes the character information, converts the character information into code information such as JIS code, ASCII code, or the like, and outputs the code information to a signal line 30a.

The voice generation circuit 32 inputs the code information outputted to the signal line 30a or 56e and outputs the voice information corresponding to the code information to the signal line 32a.

Reference numeral 36 denotes a button to select the memory reception. When the button 36 is depressed, a depression pulse is generated to a signal line 36a. The memory reception selection button 36 is depressed in case of storing reception information into the memory circuit 24.

Reference numeral 38 denotes a lamp to indicate a selection state of the memory reception. The lamp 38 is turned off when a clear pulse is generated to a signal line 56g. After that, each time the depression pulse is generated to the signal line 36a, turn-on→turn-off→turn-on is repeated. When the memory reception selection lamp 38 is on, all of the reception information is stored into the memory circuit 24. When the lamp 38 is off, the image data of the ordinary reception excluding the memory substitution reception, confidential reception, and the like is soon recorded by the record circuit 28.

When the memory reception selection lamp 38 is on, the signal of the signal level "1" is outputted to a signal line 38a. When the lamp 38 is off, the signal of the signal level "0" is outputted to the signal line 38a.

An absence selection button 40 is used to select an absence mode. When the button 40 is depressed, a depression pulse is generated to a signal line 40a.

Reference numeral 42 denotes a lamp to indicate that the absence mode is selected. When a clear pulse is generated to a signal line 56h, the lamp 42 is turned off. After that, each time the depression pulse is generated to the signal line 40a, turn-on→turn-off is repeated. When the absence selection lamp 42 is on, the absence of the partner is indicated. When the lamp 42 is off and the partner is not absent, the signal of the signal level "0" is outputted to a signal line 42a. When the lamp 42 is on and the partner is absent, the signal of the signal level "1" is outputted to the signal line 42a.

A memory reception presence lamp 44 indicates that there is a memory reception. When the signal of the signal level "1" is outputted to a signal line 56i, the lamp 44 is turned on. When the signal of the signal level "0" is outputted to the signal line 56i, the lamp 44 is turned off.

A confidential reception presence lamp 46 shows that there is a confidential reception. When the signal of the signal level "1" is outputted to a signal line 56j, the lamp 46 is turned on. When the signal of the signal level "0" is outputted to the signal line 56j, the lamp 46 is lit off.

A registration circuit 48 is a circuit to store a telephone number of a partner to be voice-outputted when the receiving operation is executed. Up to 100 (00 to 99) partners can be registered. When registering the partner into the registration circuit 48, the partner's number (either one of 00 to 99; for example, 32) is outputted to a signal line 48a. After that, subsequent to a space, the telephone number (for example, 3212-1122) of the partner to be voice-outputted is outputted. After that, a write pulse is generated to a signal line 56k.

When the telephone number registered in the registration circuit 48 is read out, the partner's number (for example, 32) is outputted to the signal line 48a and, after that, a read pulse is generated to a signal line 56l. Thus, the telephone number information (for instance, 3212-1122) registered in correspondence to the partner's number is outputted to the signal line 48a. As a receiving operation, there are two kinds of receiving methods of the memory reception in which the reception information is stored in the memory and the direct reception in which the recording is performed while receiving the reception information.

Reference numeral 50 denotes a circuit to register a time at which the reception information is voice-outputted. When time information is registered into the registration circuit 50, the time (for example, 7:00) is outputted to a signal line 50a and, after that, a write pulse is generated to a signal line 56m. When the time information registered in the registration circuit 50 is read out, a read pulse is generated to a signal line 56n. Thus, the time (e.g., 7:00) registered in the registration circuit 50 is outputted to the signal line 50a.

Reference numeral 52 denotes a circuit to register a time at which a process to voice-output the reception information is made ineffective. When time information is registered into the registration circuit 52, a time (for example, 23:00) is outputted to a signal line 52a and, after that, a write pulse is generated to a signal line 56o. When the time information registered in the registration circuit 52 is read out, a read pulse is generated to a signal line 56p. Thus, the time (e.g., 23:00) registered in the registration circuit 52 is outputted to the signal line 52a.

According to the embodiment with such a construction, characters of a document in the reception information stored in the memory circuit 24 are recognized and such information is outputted as a voice. If a confidential document which cannot be outputted so long as a password is not inputted is received, such a confidential reception document is not voice-outputted. When the absence mode is selected, the reception document is not voice-outputted as well.

As a mode in case of performing the memory reception of the reception information, there are considered a memory substitution reception mode for storing the reception information is stored into a memory when it cannot be recorded, a forced memory reception mode for storing the reception information into the memory by an instruction of the operator, and a memory reception mode for storing the reception information into the memory when the information is received in a copy operation. In case of the confidential reception or absence mode, both of the above reception information and the information on the partner side are not voice-outputted.

FIGS. 9A to 13 are flowcharts showing the operation of the seventh embodiment of the invention.

First in step S112, the signal of the signal level "0" is outputted to the signal line 56a and the CML is turned off.

In step S114, the signal "1" is outputted to the signal line 56d and the signal of the signal line 22a is inputted to the record circuit 28. In step S116, the signal of the signal level "0" is outputted to the signal line 56f and the speaker circuit 34 is turned off.

In step S118, a clear pulse is generated to the signal line 56g and the memory reception selection lamp 38 is turned off. In step S120, a clear pulse is generated to the signal line 56h and the absence selection lamp 40 is turned off.

In step S122, the signal of the signal level "0" is outputted to the signal line 56i and the memory reception lamp 44 is turned off. In step S124, the signal of the signal level "0" is outputted to the signal line 56j and the confidential reception presence lamp 46 is turned off.

In step S126, a check is made to see if the reception has been selected or not. When the reception is selected, step S128 follows. If NO, step S152 follows.

In step S128, the signal of the signal level "1" is outputted to the signal line 56a and the CML is turned on. In step S130, the signal of the signal line 28a is inputted and the presence or absence of the recording paper is checked. When there is no recording paper, step S182 follows and the memory substitution reception is executed. When there is a recording paper, step S132 follows.

In step S132, the signal of the signal line 38a is inputted and a check is made to see if the forced memory reception has been selected or not. When the forced memory reception is selected, step S182 follows. When the forced memory reception is not selected, step S134 follows and the pre-procedure is executed. In step S136, a check is made to see if the confidential reception has been selected or not. When the confidential reception is selected, step S144 follows. If NO, step S138 follows.

In step S138, the image signal is received and recorded. In step S140, the post-procedure is executed. In step S142, the signal of the signal level "0" is outputted to the signal line 56a and the CML is turned off. The processing routine advances to step S152.

In step S144, since the confidential reception has been selected, the image signal is received and stored into the memory circuit 24. In step S146, the post-procedure is executed. In step S148, the signal of the signal level "0" is outputted to the signal line 56a and the CML is turned off. In step S150, the signal of the signal level "1" is outputted to the signal line 56j and the confidential reception presence lamp 46 is turned on.

In step S152, a check is made to see if the confidential reception presence lamp 46 is on or not. When it is on, namely, when the confidentially received reception information exists in the memory circuit 24, step S154 follows. When the lamp 46 is off, namely, when the confidentially received reception information doesn't exist in the memory circuit 24, step S164 follows.

In step S154, a check is made to see if the output of the confidential reception information has been selected by a predetermined operation or not. If YES, step S156 follows. When the output is not selected, step S164 follows.

In step S156, the signal "0" is outputted to the signal line 56d. The record circuit 28 is set so as to input the signal of the signal line 26a. In step S158, the confidential reception information designated from the reception information stored in the memory circuit 24 is recorded and outputted.

In step S160, a check is made to see if the confidential reception information still exists in the memory circuit 24 or not. If YES, step S164 follows. If NO, step S162 follows.

In step S162, the signal of the signal level "0" is outputted to the signal line 56j and the confidential reception presence lamp 46 is turned off. After that, step S164 follows.

In step S164, a check is made to see if the memory reception presence lamp 44 is on or not. When it is on, namely, when there is reception information in the memory circuit 24, step S166 follows. When it is off, that is, when there is no reception information in the memory circuit 24, step S176 follows.

In step S166, a check is made to see if the output of the memory reception information has been selected or not. When the output is selected, step S168 follows. If NO, step S136 follows.

In step S168, the signal "0" is outputted to the signal line 56d and the record circuit 28 is set so as to input the signal of the signal line 26a. In step S170, the memory reception information designated and stored in the memory circuit 24 is recorded and outputted.

In step S172, a check is made to see if the memory reception information still exists in the memory circuit 24 or not. If YES, step S176 follows. If NO, step S174 follows.

In step S174, the signal of the signal level "0" is outputted to the signal line 56i and the memory reception presence lamp 44 is turned off. After that, step S176 follows.

In step S176, the signal "1" is outputted to the signal line 56d and the record circuit 28 is set so as to input the signal of the signal line 22a. In step S178, the signal of the signal level "0" is outputted to the signal line 56f and the speaker circuit 34 is turned off.

In step S180, a check is made to see if the copy operation has been selected or not. When the copy operation is selected, step S208 follows. If NO, the processing routine is returned to step S126.

In step S182, the pre-procedure is executed. In step S184, the signal line 42a is inputted and a check is made to see if the absence selection lamp 42 is on or not. When the lamp 42 is on, namely, when the absence mode is selected, step S190 follows. When the lamp 42 is off, that is, when the absence mode is not selected, step S186 follows.

In step S186, the signal of the signal level "1" is outputted to the signal line 56f and the speaker circuit 34 is turned on. In step S188, the partner's telephone number and transmission-source name which were notified by the pre-procedure in step S182 are outputted to the signal line 56e. Those information are outputted as a voice.

In step S190, the remaining pre-procedure is executed. In step S192, the image signal is received and stored into the memory circuit 24.

In step S194, the signal of the signal line 42a is inputted and a check is made to see if the absence selection lamp 42 is on or not. If the lamp 42 is off, namely, when the absence mode is not selected, step S196 follows. The characters of the document in the reception information stored in the memory circuit 24 are converted to the code information and the code information is outputted as voice information from the speaker circuit 34. Step S198 follows.

When the absence selection lamp 42 is on, namely, when the absence mode is selected, step S198 follows. A check is made to see if the reception of one communication has been finished or not. After completion of the reception of one communication, step S200 follows. If the reception of one communication is not finished, the processing routine is returned to step S192 and the reception is continued.

In step S200, the post-procedure is executed. In step S202, the signal of the signal level "0" is outputted to the signal line 56a and the CML is turned off. In step S204, the signal of the signal level "1" is outputted to the signal line 56i and the memory reception presence lamp 44 is turned on. In step S206, the signal of the signal level "0" is outputted to the signal line 56f and the speaker circuit 34 is turned off. After that, the processing routine is returned to step S152.

In step S208, the copy operation is executed. In step S210, a check is made to see if the copy operation has been finished or not. When the copy operation is finished, step S218 follows. If NO, step S212 follows.

In step S212, a check is made to see if the reception has been selected or not. If YES, step S214 follows. If NO, step S208 follows.

In step S214, a check is made to see if the reception has been finished or not. If YES, step S208 follows. If NO, step S216 follows.

In step S216, the memory reception of the facsimile information is sequentially executed. The characters of the document in the reception information stored in the memory circuit 24 are recognized and converted to the code information. The code information is outputted as voice information from the speaker circuit 34.

In step S218, a check is made to see if the reception of the facsimile information is being continued or not. If YES, step S220 follows. If NO, the processing routine is returned to step S126.

In step S220, the memory reception of the facsimile information is sequentially performed. The characters of the document in the reception information stored in the memory circuit 34 are recognized and converted to the code information. The code information is outputted as voice information from the speaker circuit 34.

As described above, according to the seventh embodiment, since the characters of the document in the reception information stored in the memory circuit 24 are recognized and outputted as a voice, the contents of the received document can be easily recognized. In the embodiment, when the memory reception is performed, the contents of the received document have been voice-outputted. However, the invention is not limited to such a case but even in case of the direct reception for recording while receiving image information, it is also possible to store the reception information into the memory circuit 24 and to voice-output the contents of the received document. In case of voice-outputting in the memory reception mode, it is promoted to record and output the image data to a recording paper and it is effective to prevent that the memory capacity is filled with the received image data.

[Eighth Embodiment]

In case of communicating by a facsimile apparatus, ordinarily, format sentences in which a sender's name, a receiver's name on the destination side, document contents, and the like are often written are added to the first page on the transmission side and the image information is transmitted. Therefore, it is also possible to voice-output only the first page of the facsimile reception information.

Figure 14:
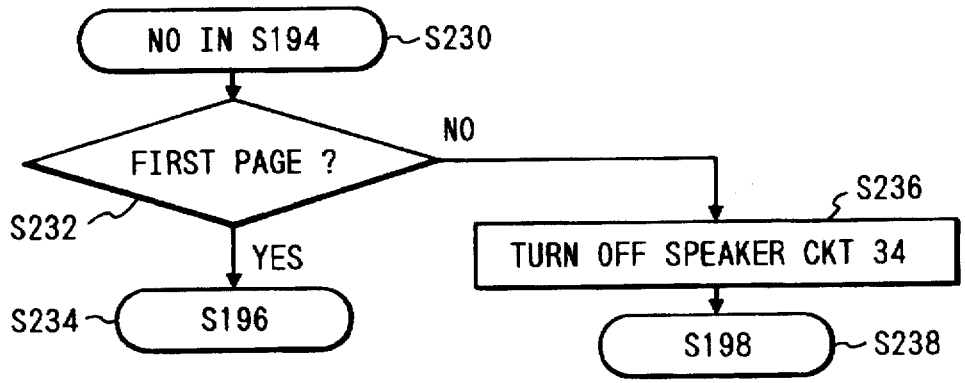

FIG. 14 is a flowchart showing portions different from those of the above seventh embodiment in the operation in such a case.

First, step S230 shows NO in the discriminating step S194. A check is made in step S232 to see if the first page has been received or not. If YES, step S234 (corresponding to step S196 mentioned above) follows. If NO, step S236 follows.

In step S236, the signal of the signal level "0" is outputted to the signal line 56f and the speaker circuit 34 is turned off. After that, step S198 follows in step S238.

According to the eighth embodiment as mentioned above, since the sender's name, receiver's name, and document contents are outputted as a voice, the necessary information can be easily recognized and the relevant receiver can promptly go to the apparatus so as to get the received document.

[Ninth Embodiment]

For example, a time such as at night during which the voice-output is not executed can be also predetermined. In the above example, it is also possible to construct in a manner such that the time at which the voice-output is made effective and the time at which the voice-output is made ineffective are registered and in a time zone in which the voice-output is effective, the voice-output is executed when the conditions of the voice-output are satisfied, and in a time zone in which the voice-output is ineffective, the voice-output is not performed even if the conditions of the voice-output are satisfied.

Figure 16A:
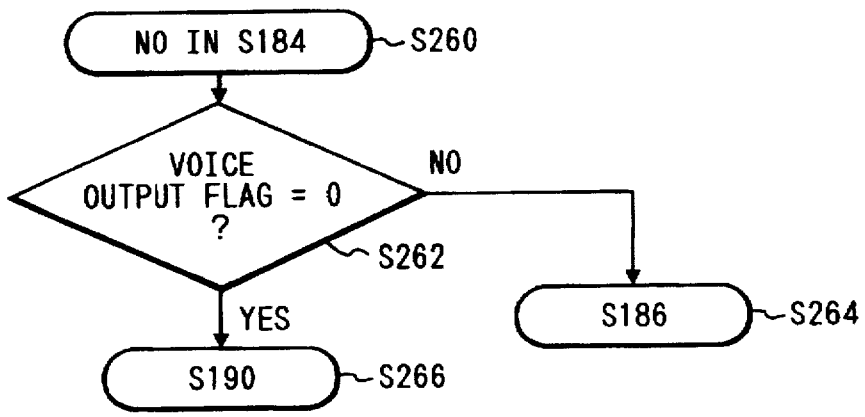
Figure 16B:
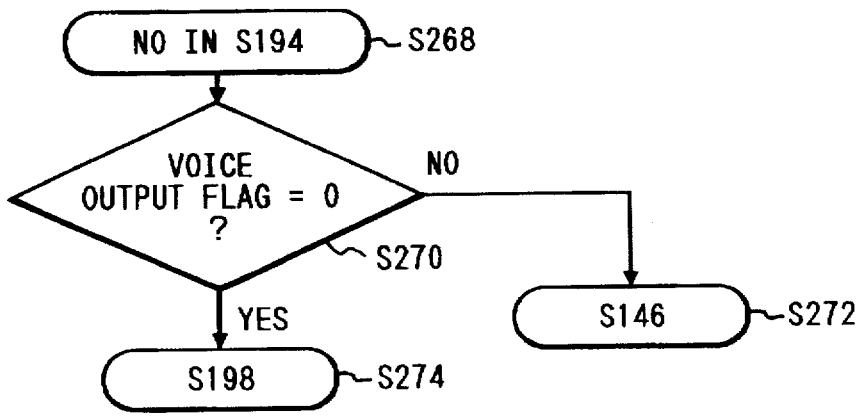
Figure 15:
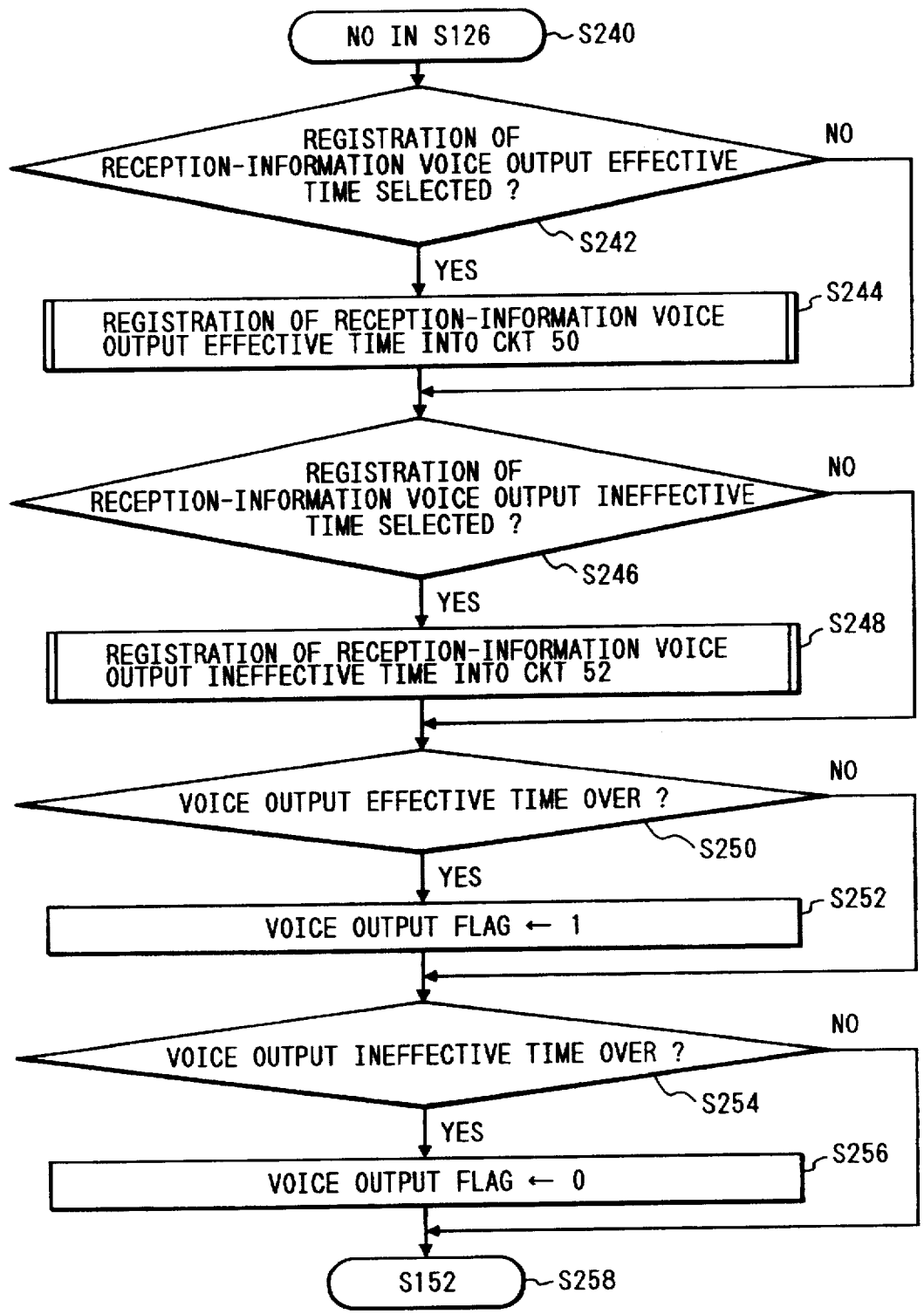
Figure 17A:
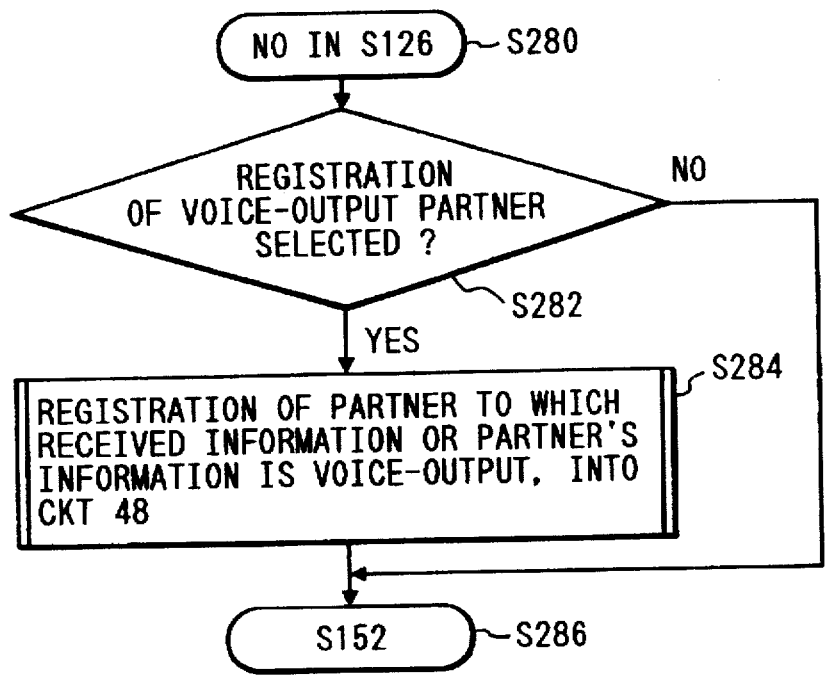
Figure 17B:
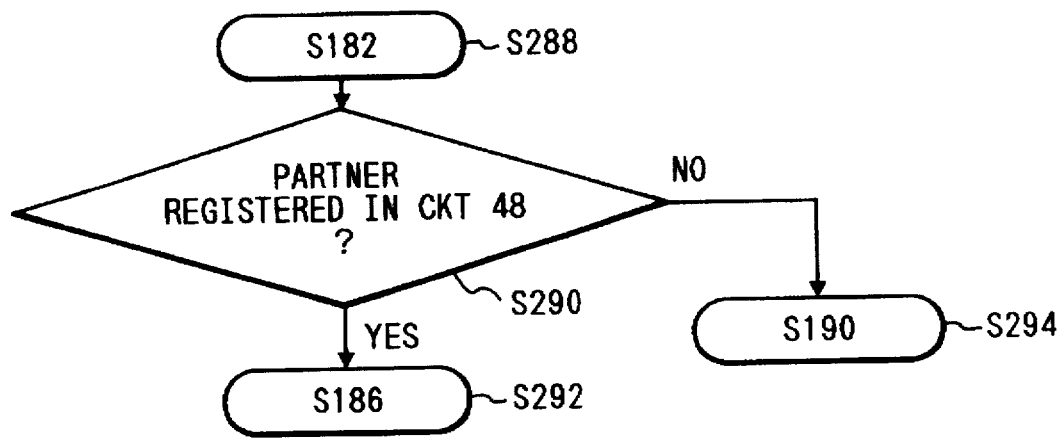
Figure 18A:
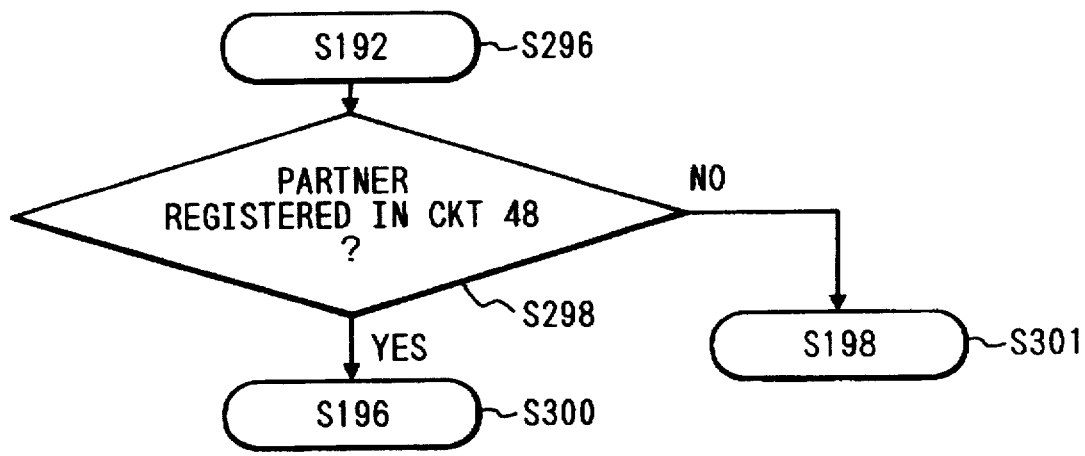
Figure 18B:
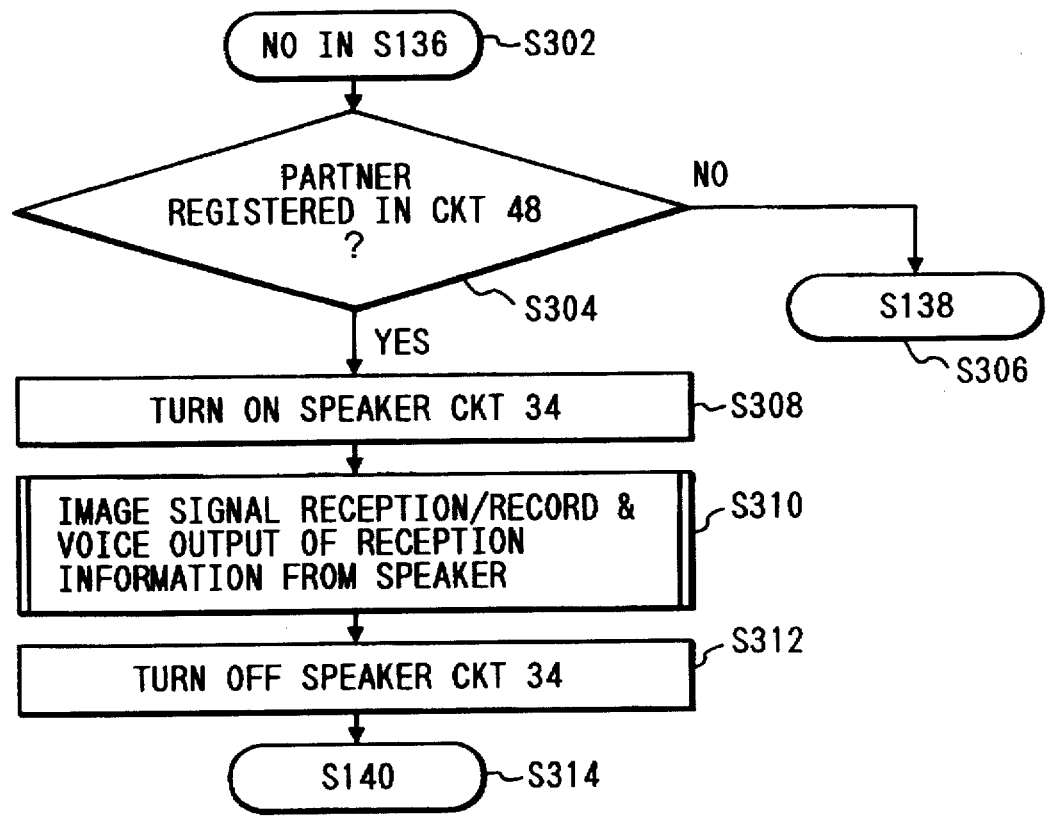

FIGS. 15, 16A, and 16B are flowcharts showing portions different from those in the seventh embodiment in the operation in such a case.

First, step S240 shows NO in the discriminating step S126. In step S242, a check is made to see if the registration of the voice-output effective time of the reception information has been selected or not. When the registration is selected, step S244 follows and the voice output effective time of the reception information is registered into the registration circuit 50. If NO, step S246 follows. As a registering operation in this case, for example, after completion of the operation indicative of the registration of the voice-output effective time, the time is inputted by the ten-key.

In step S246, a check is made to see if the registration of the voice-output ineffective time of the reception information has been selected or not. When the registration is selected, step S248 follows and the voice-output ineffective time of the reception information is registered into the registration circuit 52. If NO, step S250 follows. As a registering operation in such a case, after completion of the operation indicative of the registration of the voice-output ineffective time, the time is inputted by the ten-key in a manner similar to the registration of the voice-output effective time.

In step S250, a check is made to see if the voice-output effective time has elapsed or not. If YES, step S252 follows and "1" is set to a voice-output flag. If NO, step S254 follows. In step S254, a check is made to see if the voice-output ineffective time has elapsed or not. If YES, step S256 follows and "0" is set to the voice-output flag. If NO, step S258 (corresponding to the above step S152) follows.

As mentioned above, only when the voice-output flag is equal to 1, the voice-output of the reception information is made effective and in the other cases, the voice-output of the reception information is not executed. Thus, an unnecessary voice-output when the partner is absent can be limited.

A method of setting the time zone in which the voice-output is made effective is not limited to the method of setting two times as mentioned above. Other various methods such as a method of setting a start time and a continuation time in which the voice-output is made effective and the like can be also properly used.

[Tenth Embodiment]

It is also possible to construct in a manner such that in the case where the contents of the reception information and the partner in which the information from the partner is voice-outputted as mentioned above are previously registered and the information from the registered partner is received, the reception information or the partner's information are voice-outputted and in the case where the information from a partner which is not registered is received, the reception information or the partner's information are not voice-outputted.

FIGS. 17A, 17B, 18A, and 18B are flowcharts showing portions different from those in the seventh embodiment in the operation in such a case.

First, step S280 shows NO in the discriminating step S126. In step S282, a check is made to see if the registration of the partner to be voice-outputted has been selected or not. If YES, step S284 follows and the partner in which the reception information or partner's information is voice-outputted is registered into the registration circuit 48. If NO, step S286 (corresponding to the above step S152) follows. As a registering operation in this case, for example, after completion of the operation indicative of the registration of a partner to be voice-outputted, the partner's telephone number is inputted by the ten-key.

Step S288 shows the foregoing step S182.

In step S290, a check is made to see if the partner has been registered in the registration circuit 48 or not. If YES, step S292 (corresponding to the above step S186) follows. If NO, step S294 (S190 mentioned above) follows.

Step S296 shows the above step S192. In step S298, a check is made to see if the partner has been registered in the registration circuit 48 or not. If YES, step S300 (S196 mentioned above) follows. If NO, step S301 (S198 mentioned above) follows.

Step S302 shows NO in the above step S136. In step S304, a check is made to see if the partner has been registered in the registration circuit 48 or not. If YES, step S308 follows. If NO, step S306 (S138 mentioned above) follows.

In step S308, the signal of the signal level "1" is outputted to the signal line 56f and the speaker circuit 34 is turned on. In step S310, the image signal is received and recorded. The reception information is converted to the voice information and is generated from the speaker circuit 34.

In step S312, the signal of the signal level "0" is outputted to the signal line 56f and the speaker circuit 34 is turned off. Step S140 follows in step S314.

According to the tenth embodiment as mentioned above, the reception from the necessary partner can be certainly recognized.

[Eleventh Embodiment]

Figure 20:
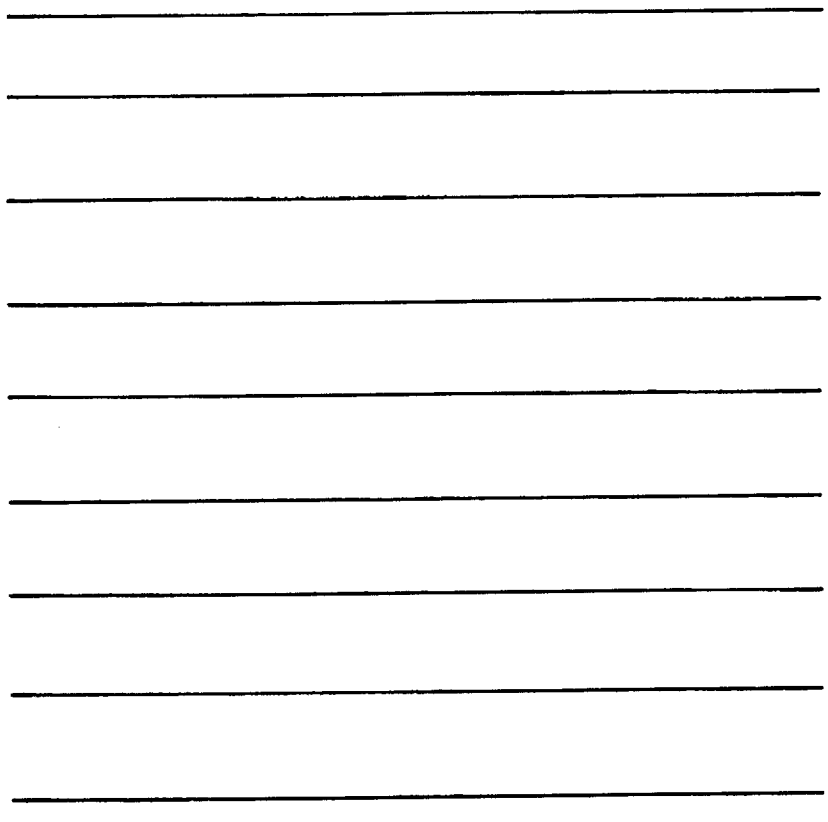
FIG. 20 is a diagram showing an example of received information added with header information.

In case of communicating by the facsimile apparatus, generally, the transmission side converts the telephone number, transmission-source name (ABC), destination name (XYZ), and the like into image data so as to be recorded as header information in an upper edge portion of a recording paper on the reception side as shown in FIG. 20 and transmits the image data. Therefore, a portion written as header information in the received information can be also character-recognized and voice-outputted.

Figure 19:
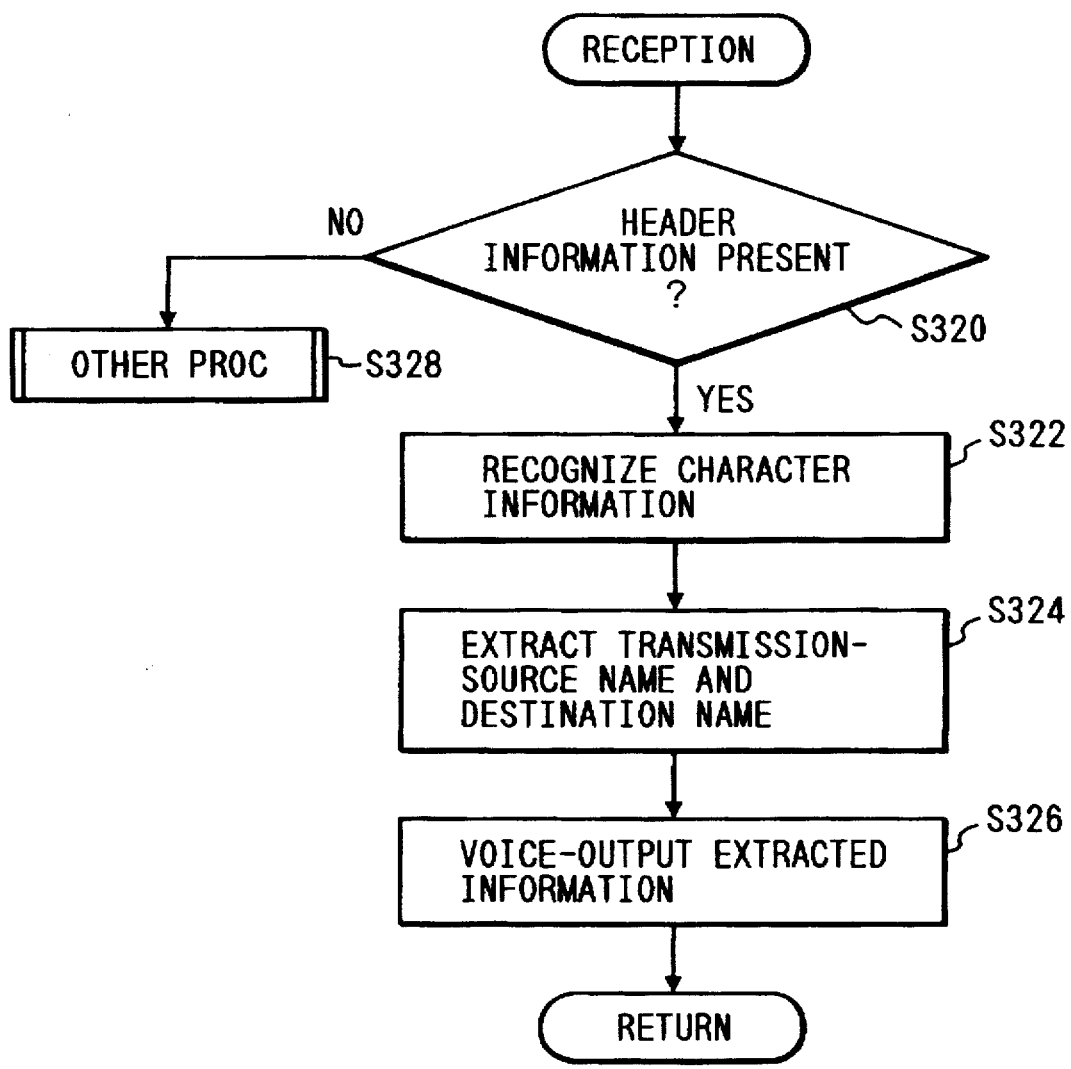

FIG. 19 is a flowchart showing a flow of the operation in such a case. Only processes which are executed until the voice-output is performed after the start of reception will now be described.

In step S320, a check is made to see if the header information is included in the received information or not. When there is the header information, step S322 follows. If NO, step S328 follows and another process is executed.

In step S322, character information of the portion corresponding to the header is recognized and converted to code information. In step S324, the transmission-source name and destination name are extracted from the recognized character information. As a method of extracting those names, for instance, those names are extracted by excluding numerals and symbols from the recognized character information.

In step S326, the extracted character information is generated as audible voice information from the speaker circuit 34.

According to the eleventh embodiment as mentioned above, since the information included in the header is recognized and voice-outputted, the position of the characters can be easily determined and the information can be easily recognized.

According to the invention as described above, in the case where the user needs the reception information, it can be voice-outputted. The user can recognize a fact that the facsimile reception was performed while executing another process.

Although the present invention has been described with respect to the preferred embodiments, the invention is not limited to the foregoing embodiments but many modifications and variations are possible within the spirit and scope of the appended claims of the invention.

What is claimed is:

1. A data communication apparatus comprising:
   receiving means for receiving image data from a transmitter side;
   notifying means for notifying, via a voice message, of a fact that the image data is to be received by said receiving means; and
   control means for controlling said receiving means such that the image data is received after said notifying means provides notification of said fact.

2. An apparatus according to claim 1, wherein said notifying means notifies, via the voice message, of data representing the transmitter side which data is sent from the transmitter side.

3. An apparatus according to claim 1, further comprising registering means for registering data representing the predetermined transmitter side, and
   wherein said notifying means notifies of said fact in a case where said receiving means receives the image data from the transmitter side registered in said registering means.

4. An apparatus according to claim 1, further comprising selecting means for selecting a time that said notifying means initiates the notification.

5. A data communication apparatus comprising:

receiving means for receiving image data from a transmitter side;

discriminating means for discriminating the number of pages of the image data received by said receiving means; and notifying means for notifying, via a voice message, of a fact that the image data was received by said receiving means and of the number of pages discriminated by said discriminating means.

6. An apparatus according to claim 5, wherein said notifying means further notifies, via the voice message, of data representing the transmitter side which data is sent from the transmitter side.

7. An apparatus according to claim 5, further comprising memory means for storing the image data received by said receiving means, and wherein said notifying means notifies of a fact that the image data received by said receiving means has been stored in said memory means.

8. An apparatus according to claim 5, wherein said notifying means notifies of a fact that an error has occurred.

9. An apparatus according to claim 8, wherein said notifying means notifies of contents of the generated error.

10. A data communication apparatus comprising:

receiving means for receiving image data from a transmitter side;

notifying means for notifying, via a voice message, of reception of the image data by said receiving means; and selecting means for selecting a time that said notifying means initiates the notification, wherein said notifying means initiates the notification at the time selected by said selecting means.

11. An apparatus according to claim 10, wherein said selecting means selects the time as designated by a user of said apparatus.

12. An apparatus according to claim 10, wherein said selecting means selects the time such that said notifying means initiates the notification before said receiving means terminates the reception of the image data.

13. An apparatus according to claim 10, wherein said selecting means selects the time such that said notifying means initiates the notification after said receiving means terminated the reception of the image data.

14. A data communication apparatus comprising:

receiving means for receiving image data from a transmitter side;

notifying means for notifying, via a voice message, reception of the image data by said receiving means;

setting means for setting a predetermined period; and control means for controlling whether or not said notifying means performs the notification for the predetermined period set by said setting means.

15. An apparatus according to claim 14, wherein the predetermined period set by said setting means is a period for which a predetermined mode is being selected.

16. An apparatus according to claim 14, wherein said setting means sets a start time and an end time of the period for which said notifying means does not perform the notification.

17. A data communication apparatus comprising:

receiving means for receiving image data from a transmitter side;

discriminating means for discriminating a kind of the image data received by said receiving means;

notifying means for notifying, via a voice message, of reception of the image data by said receiving means; and control means for controlling the notification by said notifying means, in accordance with the kind of the image data discriminated by said discriminating means.

18. An apparatus according to claim 17, wherein said control means controls said notifying means such that said notifying means does not perform the notification in a case where said discriminating means discriminates that the image data received by said receiving means was able to be made visible by inputting of a predetermined password.

19. An apparatus according to claim 17, wherein said notifying means further notifies of information representing the transmitter side.

20. An apparatus according to claim 19, wherein said control means controls said notifying means such that said notifying means does not perform the notification of the information representing the transmitter side, in a case where said discriminating means discriminates that the image data received by said receiving means was able to be made visible by inputting of a predetermined password.

21. A storage medium containing computer readable program comprising code which upon execution will cause performance of:

a receiving step of receiving image data from a transmitter side;

a notifying step of notifying, via a voice message, of a fact that the image data is to be received in said receiving step; and a control step of controlling said receiving step such that the image data is received after said fact is notified in said notifying step.

22. A storage medium containing computer readable program comprising code which upon execution will cause performance of:

a receiving step of receiving image data from a transmitter side;

a discriminating step of discriminating the number of pages of the image data received in said receiving step; and a notifying step of notifying, via a voice message, of a fact that the image data was received in said receiving step and of the number of pages discriminated in said discriminating step.

23. A storage medium containing computer readable program comprising code which upon execution will cause performance of:

a receiving step of receiving image data from a transmitter side;

a notifying step of notifying, via a voice message, of reception of the image data in said receiving step; and a selecting step of selecting a time that the notification in said notifying step initiates, wherein said notifying step initiates the notification at the time selected in said selecting step.

24. A storage medium containing computer readable program comprising code which upon execution will cause performance of:

a receiving step of receiving image data from a transmitter side;

a notifying step of notifying, via a voice message, of reception of the image data in said receiving step;

a setting step of setting a predetermined period; and a control step of controlling whether or not said notifying step performs the notification for the predetermined period set in said setting step.

25. A storage medium containing computer readable program comprising code which upon execution will cause performance of:

a receiving step of receiving image data from a transmitter side;

a discriminating step of discriminating a kind of the image data received in said receiving step;

a notifying step of notifying, via a voice message, of reception of the image data in said receiving step; and a control step of controlling the notification in said notifying step, in accordance with the kind of the image data discriminated in said discriminating step.

26. A data communication apparatus comprising:

a receiving circuit which interfaces with a telephone network to receive image data and procedure signals;

a memory circuit to store the image data received from said receiving circuit;

a voice generation circuit;

a speaker circuit connected to said voice generation circuit; and a control unit connected to said receiving circuit, memory circuit and voice generation circuit, where said control unit receives procedure signals from said receiving circuit and controls said voice generation circuit so that said voice generation circuit generates a voice message output to said speaker circuit before the image data is received.

27. A data communication apparatus comprising:

a receiving circuit which interfaces with a telephone network to receive image data;

a memory circuit to store the image data received from said receiving circuit;

a voice generation circuit;

a speaker circuit connected to said voice generation circuit; and a control unit connected to said receiving circuit, memory circuit and voice generation circuit, where said control unit counts an number of pages of image data received from said receiving circuit, and controls said voice generation circuit so that said voice generation circuit generates a voice message output to said speaker circuit including the number of pages of image data received.

28. A data communication apparatus comprising:

a receiving circuit which interfaces with a telephone network to receive image data and signals;

a memory circuit to store the image data received from said receiving circuit;

a voice generation circuit;

a speaker circuit connected to said voice generation circuit;

a control unit connected to said receiving circuit, memory circuit and voice generation circuit; and a voice output selection circuit connected to said control unit, which selects a mode based on the presence or absence of signals received from said receiving circuit, where said control unit controls said voice generation circuit so that said voice generation circuit generates a voice message output to said speaker circuit in accordance with the mode selected by said voice output selection circuit.

29. A data communication apparatus comprising:

a receiving circuit which interfaces with a telephone network to receive image data and signals;

a memory circuit to store the image data received from said receiving circuit;

a voice generation circuit;

a speaker circuit connected to said voice generation circuit;

a control unit connected to said receiving circuit, memory circuit and voice generation circuit; and an operation unit connected to said control unit, having a plurality of input designators which can be actuated by an operator, where said control unit receives input designations from said operation unit corresponding to a predetermined time period and controls said voice generation circuit so that said voice generation circuit generates or does not generate a voice message output to said speaker circuit for the predetermined time period based on signals received from said receiving circuit.

30. A data communication apparatus comprising:

a receiving circuit which interfaces with a telephone network to receive image data and signals;

a memory circuit to store the image data received from said receiving circuit;

a voice generation circuit;

a speaker circuit connected to said voice generation circuit; and a control unit connected to said receiving circuit, memory circuit and voice generation circuit, where said control unit discriminates signals received from said receiving circuit, determines a kind of the image data, and controls said voice generation circuit so that said voice generation circuit generates a voice message output to said speaker circuit in accordance with the kind of image data determined.

* * * * *

UNITED STATES PATENT AND TRADEMARK OFFICE
CERTIFICATE OF CORRECTION

PATENT NO. : 5,717,744

DATED : February 10, 1998

INVENTOR(S) : TAKEHIRO YOSHIDA ET AL.

It is certified that error appears in the above-identified patent and that said Letters Patent is hereby corrected as shown below:

Title page, item [56],

REFERENCES CITED

U.S. Patent Documents
"5,314,643  5/1994 Yoshida et al." should read
--5,315,643  5/1994 Yoshida et al.--.

COLUMN 1

Line 29, "to" should read --by--.

Line 33, "to" should read --by--.

COLUMN 5

Line 8, "circuit" should read --circuit 34.--.

COLUMN 6

Line 39, "made" should read --made to--.

COLUMN 14

Line 1, " are" (second occurrence) should read --and--.

COLUMN 17

Line 45, "terminated" should read --terminates--.

UNITED STATES PATENT AND TRADEMARK OFFICE
CERTIFICATE OF CORRECTION

PATENT NO. : 5,717,744

DATED : February 10, 1998

INVENTOR(S): TAKEHIRO YOSHIDA ET AL.

It is certified that error appears in the above-identified patent and that said Letters Patent is hereby corrected as shown below:

<u>COLUMN 19</u>

Line 41, "an" should read --a--.

Signed and Sealed this

Twenty-eighth Day of July, 1998

Attest:

BRUCE LEHMAN

*Attesting Officer*     *Commissioner of Patents and Trademarks*